US009570087B2

(12) United States Patent
Thyssen et al.

(10) Patent No.: US 9,570,087 B2
(45) Date of Patent: Feb. 14, 2017

(54) SINGLE CHANNEL SUPPRESSION OF INTERFERING SOURCES

(71) Applicant: Broadcom Corporation, Irvine, CA (US)

(72) Inventors: Jes Thyssen, San Jaun Capistrano, CA (US); Bengt J. Borgstrom, Santa Monica, CA (US)

(73) Assignee: Broadcom Corporation, Irvine, CA (US)

( * ) Notice: Subject to any disclaimer, the term of this patent is extended or adjusted under 35 U.S.C. 154(b) by 5 days.

(21) Appl. No.: 14/540,778

(22) Filed: Nov. 13, 2014

(65) Prior Publication Data

US 2015/0071461 A1 Mar. 12, 2015

Related U.S. Application Data

(63) Continuation-in-part of application No. 14/216,769, filed on Mar. 17, 2014, now Pat. No. 9,338,551.

(Continued)

(51) Int. Cl.

*G10L 21/0208* (2013.01)
*H04R 3/00* (2006.01)
*G10L 15/02* (2006.01)

(52) U.S. Cl.

CPC ...... *G10L 21/0208* (2013.01); *G10L 2015/025* (2013.01); *H04R 3/005* (2013.01)

(58) Field of Classification Search

CPC .... H04R 3/002; H04R 3/005; G10L 2015/025

(Continued)

(56) References Cited

U.S. PATENT DOCUMENTS 6,041,106 A 3/2000 Parsadayan et al.
6,369,758 B1 * 4/2002 Zhang .................. H04B 7/0851 342/378

(Continued)

FOREIGN PATENT DOCUMENTS

WO 2009/082299 A1 7/2009

OTHER PUBLICATIONS

Doclo, et al., "Frequency-domain criterion for the speech distortion weighted multichannel Wiener filter for robust noise reduction", Speech Communication 49, 2007, pp. 636-656.

*Primary Examiner* — Gerald Gauthier
(74) *Attorney, Agent, or Firm* — Fiala & Weaver P.L.L.C.

(57) ABSTRACT

Techniques described herein are directed to performing back-end single-channel suppression of one or more types of interfering sources (e.g., additive noise) in an uplink path of a communication device. The back-end single-channel suppression techniques may suppress types(s) of additive noise using one or more suppression branches (e.g., a non-spatial (or stationary noise) branch, a spatial (or non-stationary noise) branch, a residual echo suppression branch, etc.). The non-spatial branch may be configured to suppress stationary noise from the single-channel audio signal, the spatial branch may be configured to suppress non-stationary noise from the single-channel audio signal and the residual echo suppression branch may be configured to suppress residual echo from the signal-channel audio signal. The spatial branch may be disabled based on an operational mode (e.g., single-user speakerphone mode or a conference speakerphone mode) of the communication device or based on a determination that spatial information is ambiguous.

20 Claims, 17 Drawing Sheets

Related U.S. Application Data

(60) Provisional application No. 61/799,154, filed on Mar. 15, 2013, provisional application No. 62/025,847, filed on Jul. 17, 2014.

(58) Field of Classification Search
USPC .......... 381/66, 94.1, 94.2, 94.7, 71.1, 71.11; 382/224; 704/233, 244, 10, 207, 226, 232, 704/234; 345/633; 379/406.09; 706/12; 342/383
See application file for complete search history.

(56) References Cited

U.S. PATENT DOCUMENTS 7,072,834 B2 * 7/2006 Zhou .................... G10L 15/065 704/233
7,577,262 B2 8/2009 Kanamori et al.
7,930,178 B2 * 4/2011 Zhang ................. G10L 21/0208 704/224
8,005,238 B2 8/2011 Tashev et al.
8,009,840 B2 8/2011 Kellermann et al.
8,229,135 B2 7/2012 Sun et al.
8,503,669 B2 8/2013 Mao
8,565,446 B1 10/2013 Ebenezer
8,824,692 B2 9/2014 Sheerin et al.
8,989,755 B2 3/2015 Muruganathan et al.
9,002,027 B2 4/2015 Turnbull et al.
9,008,329 B1 * 4/2015 Mandel .................. G10K 15/00 381/71.1
9,036,826 B2 * 5/2015 Thyssen ................ H04M 9/082 379/406.01
9,065,895 B2 * 6/2015 Thyssen ................ H04M 9/082
9,338,551 B2 5/2016 Thyssen et al.
2002/0041679 A1 4/2002 Beaucoup
2004/0102967 A1 5/2004 Furuta et al.
2004/0138882 A1 * 7/2004 Miyazawa ............ G10L 15/065 704/233
2005/0238238 A1 * 10/2005 Xu ..................... G06K 9/00711 382/224
2006/0178874 A1 * 8/2006 En-Najjary ............. G10L 25/90 704/207
2006/0271362 A1 11/2006 Katou et al.
2006/0282262 A1 12/2006 Vos et al.
2007/0055508 A1 * 3/2007 Zhao ................... G10L 21/0216 704/226
2009/0024046 A1 1/2009 Gurman et al.
2009/0048824 A1 * 2/2009 Amada ............... G10L 21/0208 704/10
2009/0136052 A1 * 5/2009 Hohlfeld ............ G10K 11/1788 381/71.1
2009/0228272 A1 * 9/2009 Herbig .................... G10L 25/78 704/233
2009/0265168 A1 * 10/2009 Kang .................. G10L 21/0208 704/226
2009/0316924 A1 12/2009 Prakash et al.
2009/0323982 A1 12/2009 Solbach et al.
2010/0042563 A1 * 2/2010 Livingston ........... G06K 9/6226 706/12
2010/0057453 A1 * 3/2010 Valsan .................... G10L 25/78 704/232
2011/0096942 A1 * 4/2011 Thyssen .............. G10L 21/0208 381/94.1
2011/0123019 A1 * 5/2011 Gowreesunker ......... H04B 3/23 379/406.09
2011/0178798 A1 * 7/2011 Flaks .................. G10L 21/0208 704/226
2011/0216089 A1 * 9/2011 Leung ................... G06T 7/0034 345/633
2012/0093341 A1 * 4/2012 Kim .......................... H04S 7/30 381/94.7
2012/0128168 A1 * 5/2012 Gowreesunker ...... H04M 9/082 381/66
2013/0121497 A1 * 5/2013 Smaragdis ............ H04M 9/082 381/66
2013/0132077 A1 * 5/2013 Mysore ................. G10L 21/028 704/233
2013/0163781 A1 6/2013 Thyssen et al.
2013/0216056 A1 8/2013 Thyssen
2013/0216057 A1 8/2013 Thyssen et al.
2013/0266078 A1 10/2013 Deligiannis et al.
2014/0254816 A1 * 9/2014 Kim ....................... G10K 11/16 381/71.11
2014/0286497 A1 * 9/2014 Thyssen ................. H04R 3/005 381/66
2015/0071461 A1 * 3/2015 Thyssen .............. G10L 21/0208 381/94.1

* cited by examiner

300B

300H

SINGLE CHANNEL SUPPRESSION OF INTERFERING SOURCES

CROSS-REFERENCE TO RELATED APPLICATION(S)

This application is a continuation-in-part of U.S. patent application Ser. No. 14/216,769, entitled "Multi-Microphone Source Tracking and Noise Suppression," filed Mar. 17, 2014, which claims the benefit of U.S. Provisional Patent Application No. 61/799,154, entitled "Multi-Microphone Speakerphone Mode Algorithm," filed Mar. 15, 2013. This application also claims priority to U.S. Provisional Application Ser. No. 62/025,847, filed Jul. 17, 2014. Each of these applications is incorporated by reference herein.

This application is related to U.S. patent application Ser. No. 12/897,548, entitled "Noise Suppression System and Method," filed Oct. 4, 2010, which is incorporated in its entirety be reference herein.

BACKGROUND

I. Technical Field

The present invention generally relates to systems and methods that process audio signals, such as speech signals, to remove components of one or more interfering sources therefrom.

II. Background Art

The term noise suppression generally describes a type of signal processing that attempts to attenuate or remove an undesired noise component from an input audio signal. Noise suppression may be applied to almost any type of audio signal that may include an undesired noise component. Conventionally, noise suppression functionality is often implemented in telecommunications devices, such as telephones, Bluetooth® headsets, or the like, to attenuate or remove an undesired additive background noise component from an input speech signal.

An input speech signal may be viewed as comprising both a desired speech signal (sometimes referred to as "clean speech") and an additive noise signal. The additive noise signal may comprise stationary noise, non-stationary noise, echo, residual echo, etc. Many conventional noise suppression techniques are unable to effectively differentiate between, model, and suppress these different types of interfering sources, thereby resulting in a non-optimal noise-suppressed audio signal.

BRIEF SUMMARY

Methods, systems, and apparatuses are described for single-channel suppression of interfering source(s) in an audio signal, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 6:
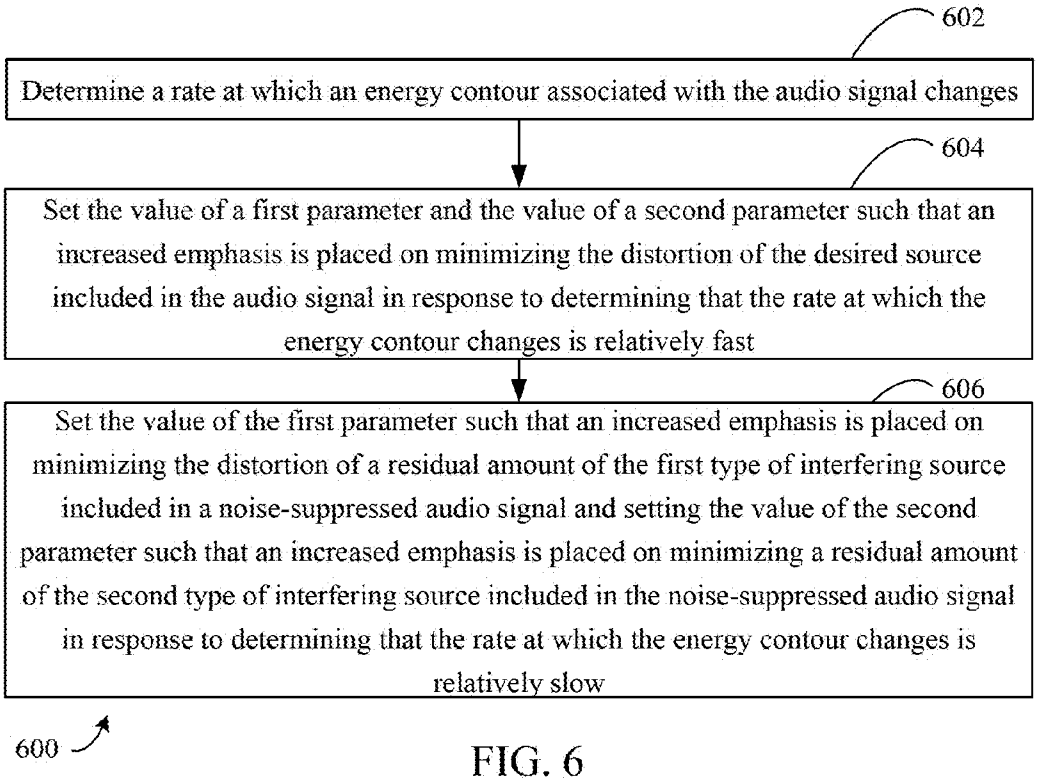

FIG. 6 depicts a flowchart of a method for setting a value of a first parameter that specifies a degree of balance between a distortion of a desired source included in an audio signal and a distortion of a residual amount of a first type of interfering source present in the audio signal and a second parameter that specifies a degree of balance between a distortion of a desired source included in an audio signal and a distortion of a residual amount of a second type of interfering source present in the audio signal based on a rate at which an energy contour associated with an audio signal changes over time, according to an example embodiment.

Figure 7:
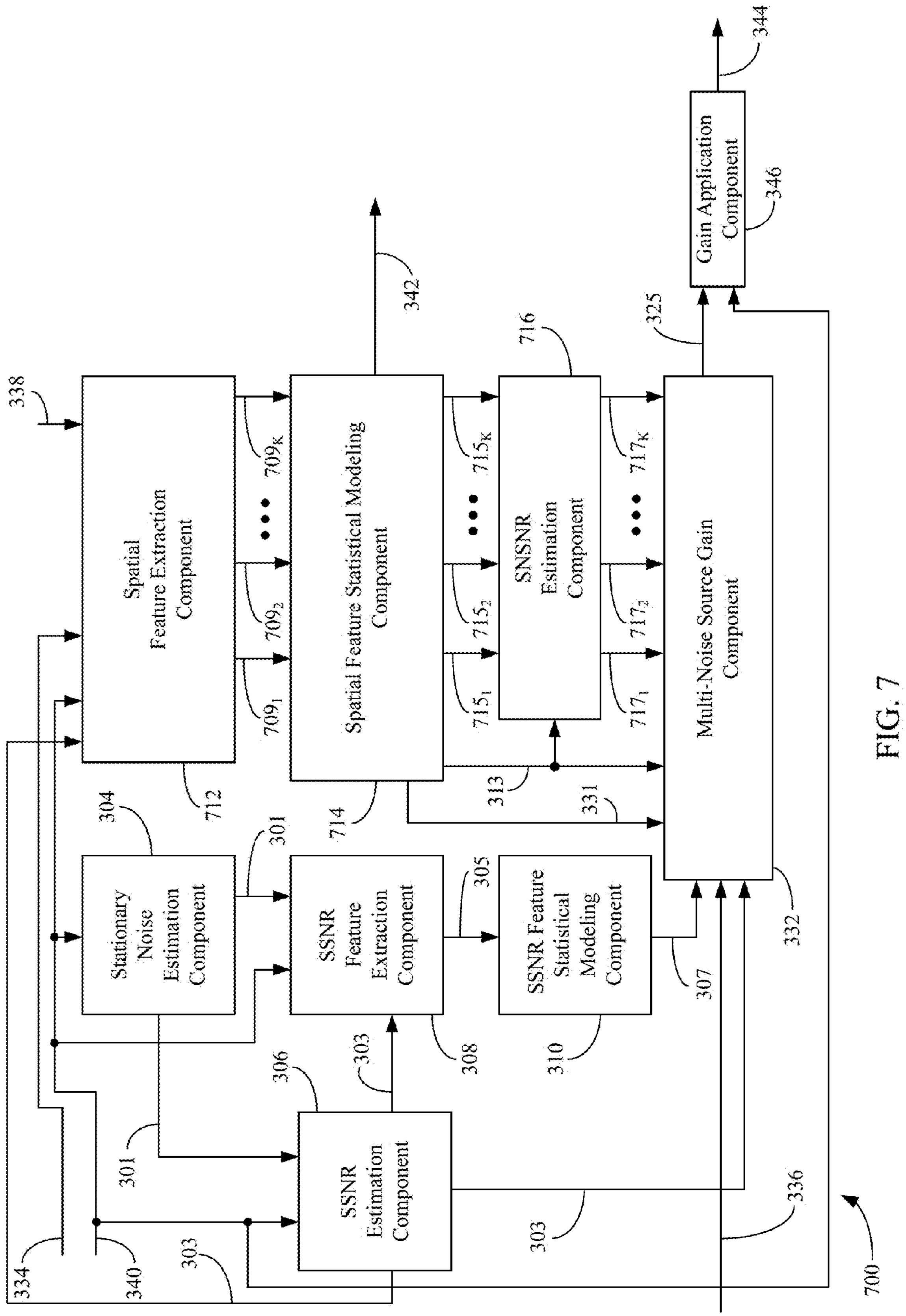

FIG. 7 is a block diagram of a back-end single-channel suppression component that is configured to suppress multiple types of non-stationary noise and/or other types of interfering sources that may be present in an audio signal, according to an example embodiment.

Figure 8:
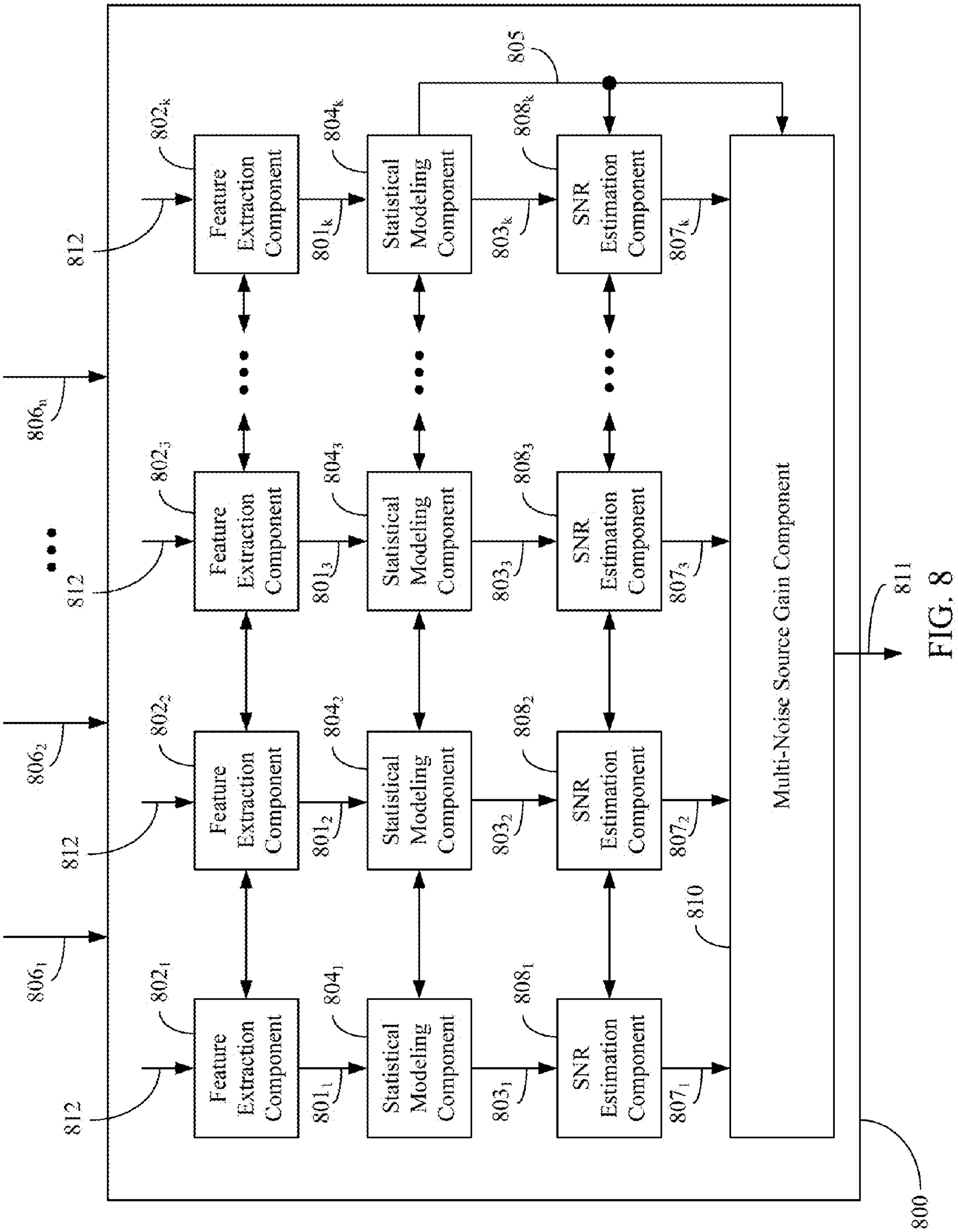

FIG. 8 is a block diagram of a generalized back-end single-channel suppression component, according to an example embodiment.

Figure 9:
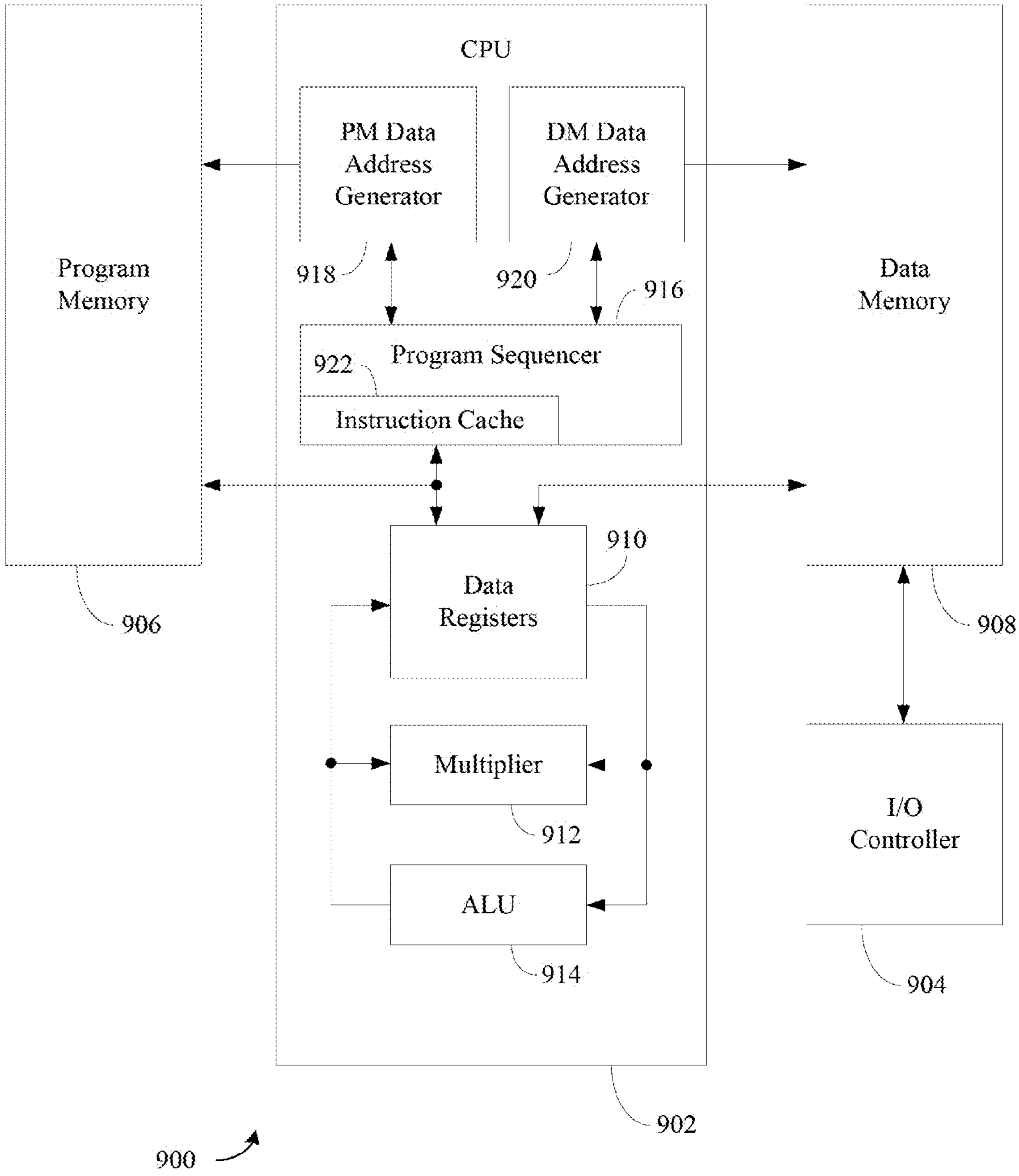

FIG. 9 is a block diagram of a processor that may be configured to perform techniques disclosed herein.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Further, descriptive terms used herein such as "about," "approximately," and "substantially" have equivalent meanings and may be used interchangeably.

Still further, the terms "coupled" and "connected" may be used synonymously herein, and may refer to physical, operative, electrical, communicative and/or other connections between components described herein, as would be understood by a person of skill in the relevant art(s) having the benefit of this disclosure.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner.

II. Example Embodiments

Techniques described herein are directed to performing back-end single-channel suppression of one or more types of interfering sources (e.g., additive noise) in an uplink path of a communication device. Back-end single-channel suppression may refer to the suppression of interfering source(s) in a single-channel audio signal during the back-end processing of the single-channel audio signal. The single-channel audio signal may be generated from a single microphone, or may be based on an audio signal in which noise has been suppressed during the front-end processing of the audio signal using multiple microphones (e.g., by applying a multi-microphone noise reduction technique).

The back-end single-channel suppression techniques may suppress types(s) of additive noise using one or more suppression branches (e.g., a non-spatial (or stationary noise) branch, a spatial (or non-stationary noise) branch, a residual echo suppression branch, etc.). The non-spatial branch may be configured to suppress stationary noise from the single-channel audio signal, the spatial branch may be configured to suppress non-stationary noise from the single-channel audio signal and the residual echo suppression branch may be configured to suppress residual echo from the signal-channel audio signal.

In embodiments, the spatial branch may be disabled based on an operational mode (e.g., single-user speakerphone mode or a conference speakerphone mode) of the communication device or based on a determination that spatial information (e.g., information that is used to distinguish a desired source from non-stationary noise present in the single-channel audio signal) is ambiguous.

The example techniques and embodiments described herein may be adapted to various types of communication devices, communications systems, computing systems, electronic devices, and/or the like, which perform back-end single-channel suppression in an uplink path in such devices and/or systems. For example, back-end single-channel suppression may be implemented in devices and systems according to the techniques and embodiments herein. Furthermore, additional structural and operational embodiments, including modifications and/or alterations, will become apparent to persons skilled in the relevant arts) from the teachings herein.

For instance, methods, systems, and apparatuses are provided for suppressing multiple types of interfering sources included in an audio signal. In an example aspect, a method is disclosed. In accordance with the method, an audio signal that comprises at least a desired source component and at least one interfering source type is received. A noise suppression gain is determined based on a statistical modeling of at least one feature associated with the audio signal using a mixture model comprising a plurality of model mixtures. Each of the plurality of model mixtures are associated with one of the desired source component or an interfering source type of the at least one interfering source type.

A method for determining and applying suppression of interfering sources to an audio signal is further described herein. In accordance with the method, one or more first characteristics associated with a first type of interfering source included in an audio signal are determined One or more second characteristics associated with a second type of interfering source included in the audio signal are also determined A gain is determined based on the one or more first characteristics and the one or more second characteristics. The determined gain is applied to the audio signal.

A system for determining and applying suppression of interfering sources to an audio signal is also described herein. The system includes a signal-to-stationary noise ratio feature statistical modeling component configured to determine one or more first characteristics associated with a first type of interfering source included in the audio signal. The system also includes a spatial feature statistical modeling component configured to determine one or more second characteristics associated with a second type of interfering source included in the audio signal. The system further includes a multi-noise source gain component configured to determine a gain based on the one or more first characteristics and the one or more second characteristics, and a gain application component configured to apply the determined gain to the audio signal.

Various example embodiments are described in the following subsections. In particular, example device and system embodiments are described. This is followed by example single-channel suppression embodiments, followed by further example embodiments. An example processor circuit implementation is also described. Finally, some concluding remarks are provided. It is noted that the division of the following description generally into subsections is provided for ease of illustration, and it is to be understood that any type of embodiment may be described in any subsection.

III. Example Device and System Embodiments

Systems and devices may be configured in various ways to perform back-end single-channel suppression of interfering source(s) included in an audio signal. Techniques and embodiments are also provided for implementing devices and systems with back-end single-channel suppression.

Figure 1:
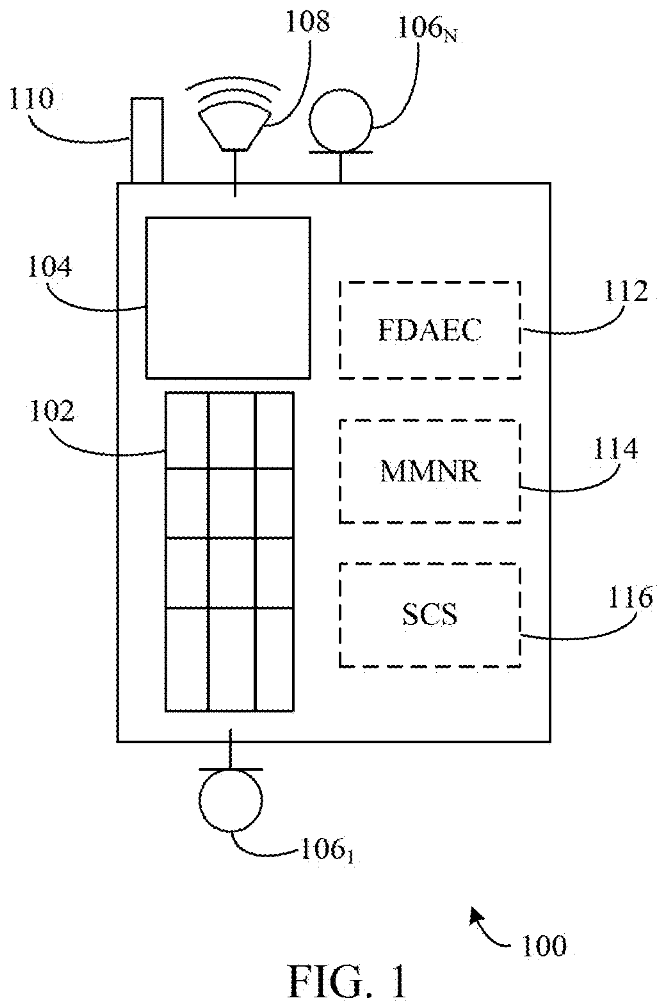
FIG. 1 is a block diagram of a communication device, according to an example embodiment.

For instance, FIG. 1 shows an example communication device 100 for implementing back-end single-channel suppression in accordance with an example embodiment. Communication device 100 may include an input interface 102, an optional display interface 104, a plurality of microphones $\mathbf{106}_1$-$\mathbf{106}_N$, a loudspeaker 108, and a communication interface 110. In embodiments, as described in further detail below, communication device 100 may include one or more instances of a frequency domain acoustic echo cancellation (FDAEC) component 112, a multi-microphone noise reduction (MMNR) component 114, and/or a single-channel suppression (SCS) component 116. In embodiments, communication device 100 may include one or more processor circuits (not shown) such as processor circuit 1200 of FIG. 12 described below.

In embodiments, input interface 102 and optional display interface 104 may be combined into a single, multi-purpose input-output interface, such as a touchscreen, or may be any other form and/or combination of known user interfaces as would understood by a person of skill in the relevant art(s) having the benefit of this disclosure.

Furthermore, loudspeaker 108 may be any standard electronic device loudspeaker that is configurable to operate in a speakerphone or conference phone type mode (e.g., not in a handset mode). For example, loudspeaker 108 may comprise an electro-mechanical transducer that operates in a well-known manner to convert electrical signals into sound waves for perception by a user. In embodiments, communication interface 110 may comprise wired and/or wireless communication circuitry and/or connections to enable voice and/or data communications between communication device 100 and other devices such as, but not limited to, computer networks, telecommunication networks, other electronic devices, the Internet, and/or the like.

While only two microphones are illustrated for the sake of brevity and illustrative clarity, plurality of microphones $\mathbf{106}_1$-$\mathbf{106}_N$ may include two or more microphones, in embodiments. Each of these microphones may comprise an acoustic-to-electric transducer that operates in a well-known manner to convert sound waves into an electrical signal. Accordingly, plurality of microphones $\mathbf{106}_1$-$\mathbf{106}_N$ may be said to comprise a microphone array that may be used by communication device 100 to perform one or more of the techniques described herein. For instance, in embodiments, plurality of microphones $\mathbf{106}_1$-$\mathbf{106}_N$ may include 2, 3, 4, . . . , to N microphones located at various locations of communication device 100. Indeed, any number of microphones (greater than one) may be configured in communication device 100 embodiments. As described herein, embodiments that include more microphones in plurality of microphones $\mathbf{106}_1$-$\mathbf{106}_N$ provide for finer spatial resolution of beamformers for suppressing interfering sources and for better tracking sources. In certain single-microphone embodiments, back-end SCS 116 can be used by itself without MMNR 114.

In embodiments, FDAEC component 112 is configured to provide a scalable algorithm and/or circuitry for two to many microphone inputs. MMNR component 114 is configured to include a plurality of subcomponents for determining and/or estimating spatial parameters associated with audio sources, for directing a beamformer, for online modeling of acoustic scenes, for performing source tracking, and for performing adaptive noise reduction, suppression, and/or cancellation. In embodiments, SCS component 116 is configurable to perform single-channel suppression of interfering source(s) using non-spatial information, using spatial information, and/or using downlink signal information. Further details and embodiments of FDAEC component 112, MMNR component 114, and SCS component 116 are provided below.

While FIG. 1 is shown in the context of a communication device, the described embodiments may be applied to a variety of products that employ multi-microphone noise suppression for speech signals. Embodiments may be applied to portable products, such as smart phones, tablets, laptops, gaming systems, etc., to stationary products, such as desktop computers, office phones, conference phones, gaming systems, etc., and to car entertainment/navigation systems, as well as being applied to further types of mobile and stationary devices. Embodiments may be used for MMNR and/or suppression for speech communication, for enhancing speech signals as a pre-processing step for automated speech processing applications, such as automatic speech recognition (ASR), and in further types of applications.

Figure 2:
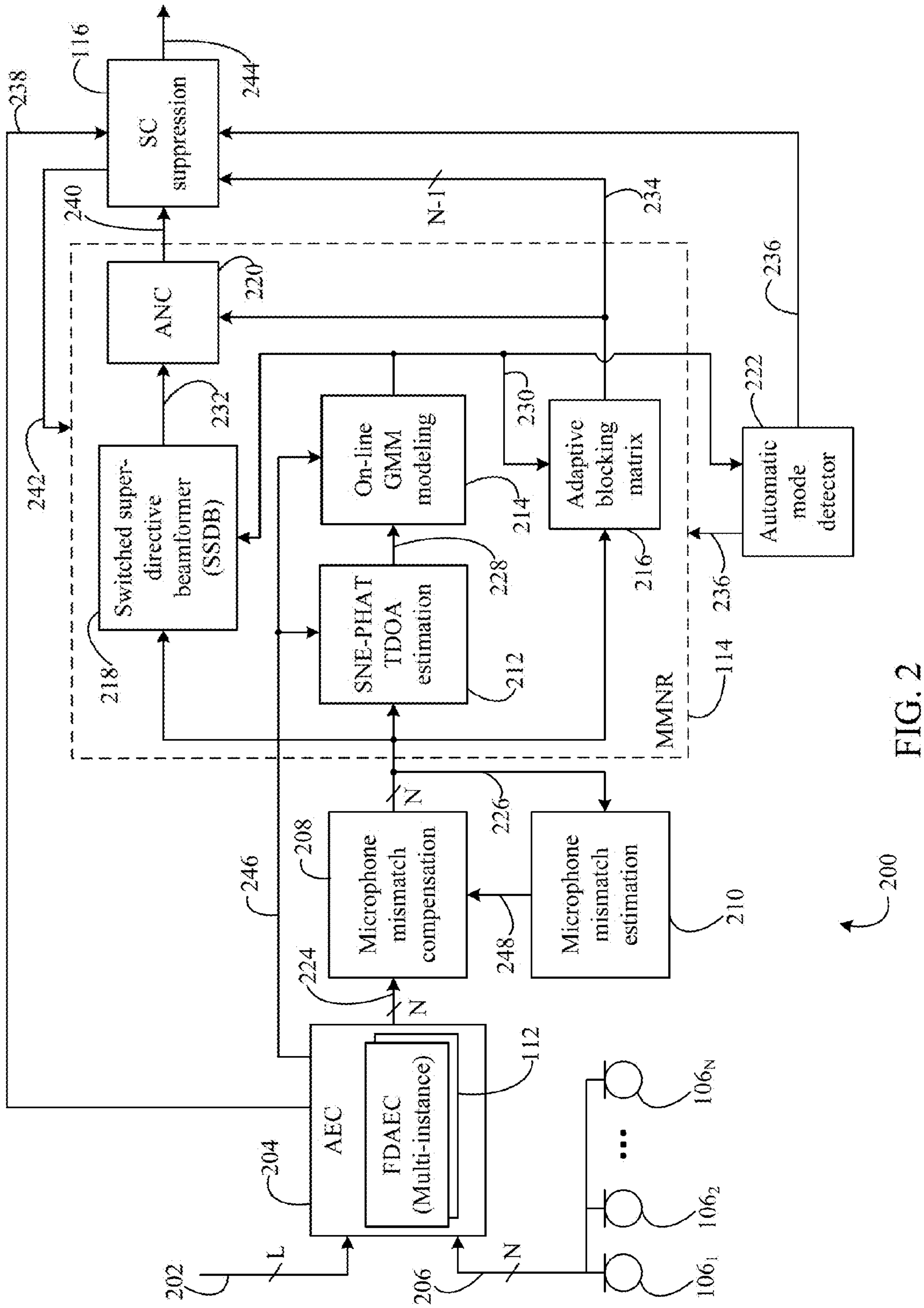
FIG. 2 is a block diagram of an example system that includes multi-microphone configurations, frequency domain acoustic echo cancellation, source tracking, switched super-directive beamforming, adaptive blocking matrices, adaptive noise cancellation, and single-channel suppression, according to example embodiments.

Turning now to FIG. 2, a system 200 is shown in accordance with an example embodiment. System 200 may be a further embodiment of a portion of communication device 100 of FIG. 1. For example, in embodiments, system 200 may be included, in whole or in part, in communication device 100. As shown, system 200 includes plurality of microphones $\mathbf{106}_1$-$\mathbf{106}_N$, FDAEC component 112, MMNR component 114, and SCS component 116. System 200 also includes an acoustic echo cancellation (AEC) component 204, a microphone mismatch compensation component 208, a microphone mismatch estimation component 210, and an automatic mode detector 222. In embodiments, FDAEC component 112 may be included in AEC component 204 as shown, and references to AEC component 204 herein may inherently include a reference to FDAEC component 112 unless specifically stated otherwise. MMNR component 114 includes a steered null error phase transform (SNE-PHAT) time delay of arrival (TDOA) estimation component 212, an on-line Gaussian mixture model (GMM) modeling component 214, an adaptive blocking matrix (ABM) component 216, a switched super-directive beamformer (SSDB) 218, and an adaptive noise canceller (ANC) 220. In some embodiments, automatic mode detector 222 may be structurally and/or logically included in MMNR component 114. It is noted that component 112 may use acoustic echo cancellation schemes other than FDAEC and that estimation component 212 may use source tracking schemes other than SNE-PHAT and that the usage of the terms FDAEC and SNE-PHAT are purely exemplary.

In embodiments, MMNR component 114 may be considered to be the front-end processing portion of system 200 (e.g., the “front end”), and SCS component 116 may be considered to be the back-end processing portion of system 200 (e.g., the “back end”). For the sake of simplicity when referring to embodiments herein, AEC component 204, FDAEC component 112, microphone mismatch compensation component 208, and microphone mismatch estimation component 210 may be included in references to the front end.

As shown in FIG. 2, plurality of microphones $\mathbf{106}_1$-$\mathbf{106}_N$ provides N microphone inputs 206 to AEC 204 and its instances of FDAEC 112. AEC 204 also receives a downlink signal 202 (a signal received from a far-end device) as an input, which may include one or more downlink signals "L" in embodiments. AEC 204 provides echo-cancelled outputs 224 to microphone mismatch compensation component 208, provides residual echo information 238 to SCS component 116, and/or provides downlink-uplink coherence information 246 (i.e., an estimate of the coherence between the downlink and uplink signals as a measure of residual echo presence) to SNE-PHAT TDOA estimation component 212 and/or on-line GMM modeling component 214. Microphone mismatch estimation component 210 provides estimated microphone mismatch values 248 to microphone mismatch compensation component 208. Microphone mismatch compensation component 208 provides compensated microphone outputs 226 (e.g., normalized microphone outputs) to microphone mismatch estimation component 210 (and in some embodiments, not shown, microphone mismatch estimation component 210 may also receive echo-cancelled outputs 224 directly), to SNE-PHAT TDOA estimation component 212, to adaptive blocking matrix component 216, and to SSDB 218. SNE-PHAT TDOA estimation component 212 provides spatial information 228 to on-line GMM modeling component 214, and on-line GMM modeling component 214 provides statistics, mixtures, and probabilities 230 based on acoustic scene modeling to automatic mode detector 222, to adaptive blocking matrix component 216, and to SSDB 218. SSDB 218 provides a desired source single output selected signal 232 to ANC 220, and ABM component 216 provides non-desired source signals 234 to ANC 220, as well as to SCS component 116. Automatic mode detector 222 provides a mode enable signal 236 to MMNR component 114 and to SCS component 116, ANC 220 provides a noise-cancelled (or enhanced) source signal 240 to SCS component 116, and SCS component 116 provides a suppressed signal 244 as an output for subsequent processing and/or uplink transmission. SCS component 116 also provides a soft-disable control signal 242 to MMNR component 114.

Additional details regarding plurality of microphones $\mathbf{106}_1$-$\mathbf{106}_N$, FDAEC component 112, MMNR component 114, AEC component 204, microphone mismatch compensation component 208, microphone mismatch estimation component 210, automatic mode detector 222, SNE-PHAT TDOA estimation component 212, on-line GMM modeling component 214, ABM component 216, SSDB 218 and ANC 220 are provided in commonly-owned, co-pending U.S. patent application Ser. No. 14/216,769, the entirety of which has been incorporated by reference as if fully set forth herein.

SCS component 116 is configured to perform single-channel suppression of interfering source(s) on enhanced source signal 240. SCS component 116 is configured to perform single-channel suppression using non-spatial information, using spatial information, and/or using downlink signal information. SCS component 116 is also configured to determine spatial ambiguity in the acoustic scene, and to provide a soft-disable control signal 242 that causes MMNR 114 (or portions thereof) to be disabled when SCS component 116 is in a spatially ambiguous state. As noted above, in embodiments, one or more of the components and/or sub-components of system 200 may be configured to be dynamically disabled based upon enable/disable outputs received from the back end, such as soft-disable control signal 242. The specific system connections and logic associated therewith is not shown for the sake of brevity and illustrative clarity in FIG. 2, but would be understood by persons of skill in the relevant art(s) having the benefit of this disclosure.

IV. Example Back-End Single-Channel Suppression System and Methods

Techniques described herein are directed to performing back-end single-channel suppression of one or more types of interfering sources (e.g., additive noise) in an uplink path of a communication device. In accordance with an embodiment, back-end single-channel is performed based on a statistical modeling of acoustic source(s). Examples of such sources include desired speaker(s), interfering speaker(s), stationary noise (e.g., diffuse or point-source noise), non-stationary noise, residual echo, reverberation, etc.

Various example embodiments are described in the following subsections. In particular, subsection IV.A describes how acoustic sources are statistically modelled, and subsection IV.B describes a system that implements the statistical modeling of acoustic sources to suppress multiple types of interfering sources from an audio signal.

A. Statistical Modeling of Acoustic Sources

Statistical modeling may be comprised of two steps, namely adaptation and inference. First, models are adapted to current observations to capture the generally non-stationary states of the underlying processes. Second, inference is performed to classify subpopulations of the data, and extract information regarding the current acoustic scene. Ultimately, the goal of back-end modeling is to provide the system with time- and frequency-specific probabilistic information regarding the activity of various sources, which can then be leveraged during the calculation of the back-end noise suppression gain (e.g., calculated by multi-noise source gain component 332, as described below with reference to FIG. 3C).

In this subsection, an illustrative example of a unified statistical model for back-end single-channel suppression (e.g., as performed by back-end SCS component 300, as described below with reference to FIG. 3C) is presented. That is, one model is constructed to capture all present acoustic sources. This allows back-end single-channel suppression to fully exploit any statistical correlation between acoustic sources. However, in many cases the back-end modeling can be achieved with lower complexity by constructing several parallel branches, each using a model of lower dimensionality. Further details on the use of multiple branches will be provided below in subsection IV.B. However, the theory derived in this subsection in the context of a unified statistical model is easily applied to smaller models as well.

1. Gaussian Mixture Modeling (GMM)

Mixture models (MMs) are hierarchical probabilistic models which can be used to represent statistical distributions of arbitrary shape. In particular, MMs are useful when modeling the marginal distribution of data in the presence of subpopulations. Formally, mixture models correspond to a linear mixing of individual distributions, where mixing weights are used to control the effect of each.

Specifically, the Gaussian mixture model (GMM) serves as an efficient tool for estimating data distributions, particularly of a dimension greater than one, due to various attractive mathematical properties. For example, given a set of training data, the maximum likelihood (ML) estimates of the mean vector and covariance matrix are obtainable in closed form.

The GMM distribution of a random variable $x_n$, of dimension D is given by Equation 1, which is shown below:

$$p(x_n \mid \varphi) = \sum_{m=1}^{M} \frac{w_m}{(2\pi)^{D/2}|C_m|^{1/2}} \exp\left(-\frac{1}{2}(x_n-\mu_m)^T C_m^{-1}(x_n-\mu_m)\right), \quad \text{Equation 1}$$

where $\phi=\{\mu_1, \ldots, \mu_M, C_1, \ldots, C_M, w_1, \ldots, w_M\}$ is the set of parameters which defines the GMM, $\mu_m$ represent Gaussian means, $C_m$ represent Gaussian covariance matrices, $w_m$ represent mixing weights, and M denotes the number of mixtures (i.e., model mixtures) in the GMM. Thus, evaluating the probability distribution function (pdf) of a trained GMM involves the calculation of the above equation for a given data point $x_n$.

The adaptation step of back-end statistical modeling performs parameter estimation to obtain a trained model based on a set of training data, i.e., adapting the set $\phi$. Parameter estimation optimizes model parameters by maximizing some cost function. Examples of common cost functions include the ML and maximum a posteriori (MAP) cost functions. Here, the training process of a GMM for batch processing is described, where all training data is accessible at once. In subsection IV.A.3, this process is extended to online training, in which training samples are observed successively, and parameter estimation is performed iteratively to adapt to changing environments.

An example of the ML cost for the training process of a GMM for batch processing is shown below as Equation 2. Let the set $\{x_1, x_2, \ldots, x_N\}$ be a set of N data samples of dimension D:

Equation 2

$$J_{ML}(x_1, \ldots, x_N) = \log\prod_{n=1}^{N}\sum_{m=1}^{M}N(x_n; \mu_m, C_m) = \sum_{n=1}^{N}\log\left[\sum_{m=1}^{M}\frac{w_m}{(2\pi)^{D/2}|C_m|^{1/2}}\exp\left(-\frac{1}{2}(x_n-\mu_m)^T C_m^{-1}(x_n-\mu_m)\right)\right],$$

where the function $N(x_n;\mu_n,C_m)$ denotes the evaluation of a Gaussian distribution with parameters $\mu_m$, and $C_m$ at $x_n$.

Parameter estimation for a mixture model is not possible in closed-form due to the ambiguity associated with mixture membership of data samples. However, several methods exist to estimate mixture model parameters iteratively. One such technique is the expectation-maximization (EM) algorithm, which assumes data mixture membership to be hidden random processes. The solution to EM parameter estimation reduces to a two-step iterative process, in which minimum mean-square error (MMSE) point estimates of data mixture membership are first obtained, and ML or MAP estimates of Gaussian parameters are then obtained conditioned on mixture membership estimates. Mathematically, for the $(i+1)^{th}$ iteration, this is expressed as:

Equation 3

$$\mu_m^{i+1} = \frac{\sum_{n=1}^{N} P^i(m \mid x_n)x_n}{\sum_{n=1}^{N} P^i(m \mid x_n)},$$

Equation 4

$$C_m^{i+1} = \frac{\sum_{n=1}^{N} P^i(m \mid x_n)(x_n-\mu_m^i)(x_n-\mu_m^i)^T}{\sum_{n=1}^{N} P^i(m \mid x_n)}$$

Equation 5

$$w_m^{i+1} = \frac{P^i(m \mid x_n)}{\sum_{j=1}^{M} P^i(j \mid x_n)},$$

where:

Equation 6

$$P^i(m \mid x_n) = \frac{w_m^i N(x_n; \mu_m^i, C_m^i)}{\sum_{j=1}^{M} w_j^i N(x_n; \mu_j^i, C_j^i)},$$

The above steps can be performed iteratively until convergence of the parameters.

2. Feature Vector

The use of GMMs allows freedom in designing the feature vector, $x_n$. Generally, the feature vector should be constructed to include elements which may provide discriminative information for the inference step of back-end statistical modeling. Furthermore, it is advantageous to include elements which provide complementary information. Finally, when using GMMs, feature elements should be conditioned to better fit the Gaussian assumption implied by the use of this model. For example, features which occur naturally in the form of ratios can be used in the log domain because this avoids the non-negative, highly-skewed nature of ratios.

Examples of features that can make up the feature vector are discussed below in subsection IV.B. However, the notation $x_n(k)$ to represent the $k^{th}$ element of a full-band feature vector corresponding to time index n is introduced. In the case of frequency-dependent feature vectors, the notation $x_{n,m}(k)$ represents the $k^{th}$ element of a feature vector corresponding to time index n and frequency channel m.

3. Online/Adaptive Update of GMM Parameters

The GMM parameter estimation in subsection IV.A.1 assumes the availability of all training samples. However, such batch processing is not realistic for communication systems, wherein successive (training) samples are observed in time and delay to buffer future samples is not practical. Instead, an online method to adapt the GMM parameters as new samples arrive (e.g., during a communication session) is desirable. In online GMM parameter estimation, it is assumed that the GMM has previously been trained on a set of N past samples. The system then observes K new samples, and the GMM is updated based on these new samples. One method by which to perform online parameter estimation is to use the MAP cost function. This involves defining the a priori distribution of $\phi$ conditioned on the original N data samples.

Assume the initial N samples were used for parameter estimation to obtain initial parameter estimates $\phi'=\{\mu'_1, \ldots, \mu'_M, C'_1, \ldots, C'_M, w'_1, \ldots, w'_M\}$. The EM approach can then be applied to the MAP cost function, similar to the case of the ML cost function in subsection IV.A.1, to obtain the new parameter estimates based on the next K samples. By making a few assumptions regarding the a priori distribution of $\phi$, the EM solution to online parameter estimation can be expressed as:

Equation 7

$$\mu_m = \alpha_m \frac{\sum_{n=N+1}^{N+K} P'(m \mid x_n)x_n}{\sum_{n=N+1}^{N+K} P'(m \mid x_n)} + (1+\alpha_m)\mu'_m,$$

Equation 8

$$C_m = \alpha_m \frac{\sum_{n=N+1}^{N+K} P'(m \mid x_n)x_n x_n^T}{\sum_{n=N+1}^{N+K} P'(m \mid x_n)} + (1+\alpha_m)(C'_m + \mu'_m \mu'^T_m) - \mu_m \mu_m^T,$$

-continued $$w_m = \alpha_m \frac{P'(m \mid x_n)}{\sum_{j=1}^{M} P'(j \mid x_n)} + (1 - \alpha_m) w'_m, \quad \text{Equation 9}$$

where:

$$P'(m \mid x_n) = \frac{w'_m N(x_n; \mu'_m, C'_m)}{\sum_{j=1}^{M} w'_j N(x_n; \mu'_j, C'_j)}, \quad \text{Equation 10}$$

and:

$$\alpha_m = \frac{\sum_{n=N+1}^{N+K} P'(m \mid x_n)}{\sum_{n=N+1}^{N+K} P'(m \mid x_n) + N w_m}, \quad \text{Equation 11}$$

The above solution places equal weight on each of the (N+K) data samples during parameter estimation. When modeling non-stationary processes, however, it may be advantageous to place emphasis on recent samples because they can provide a better representation of the current state of the underlying random processes. A simple heuristic method by which to emphasize recent samples is to calculate $\alpha_m$ in an alternative manner, as shown below in Equation 12:

$$\alpha_m = \frac{\sum_{n=N+1}^{N+K} P'(m \mid x_n)}{\sum_{n=N+1}^{N+K} P'(m \mid x_n) + \min(N w_m, N_{max})}, \quad \text{Equation 12}$$

where $N_{max}$, corresponds to some constant. Thus, $\alpha_m$ avoids convergence to zero as the total number of observed data samples N grows very large.

4. Knowledge-driven Parameter Constraints

In the previous sections, parameter estimation for GMMs was described from a purely data-driven view. However, as will be discussed below in subsection IV.A.5, the inference phase of this two-step statistical analysis framework makes the assumption that each acoustic source is represented by at least one mixture. If parameter estimation is performed in an unsupervised manner, the adapted back-end GMM will generally not be consistent with this assumption. For example, if a certain acoustic source is inactive for a given duration, the corresponding mixture may be absorbed by a statistically similar source, and the particular acoustic source will no longer be modelled. Additionally, if a certain acoustic source exhibits features with non-Gaussian behavior, unsupervised parameter estimation may look to model the particular source with multiple mixtures. In order to maintain the validity of the assumption that each acoustic source is represented by a single GMM mixture, knowledge-driven constraints are placed on parameters during parameter estimation. These knowledge-driven constraints are applied after each iteration of data-driven parameter estimation.

4.1 Minimum Constraints on Mixture Priors

In order to avoid mixtures corresponding to temporarily inactive sources from being absorbed by statistically similar active sources, minimum constraints can be placed on mixture priors. That is, after an iteration of data-driven parameter estimation, mixture priors are floored at a threshold. This generally requires all mixture priors to be altered, due to the constraint that mixture weights must sum to unity. Application of minimum constraints on mixture priors maintains the presence of acoustic source mixtures, even during extended periods of source inactivity. Additionally, it allows GMM modeling to rapidly recapture the inactive source when it eventually becomes active.

4.2 Minimum and Maximum Constraints on Mixture Means

Using intuition regarding the design of feature elements of $x_n$, mixture means corresponding to various sources can often be expected to inhabit specific ranges in feature space. Thus, knowledge-driven mean constraints can be applied to the back-end GMM to ensure that mixture means representing various acoustic sources remain in these ranges. Minimum and maximum mean constraints can avoid scenarios during data-driven parameter estimation wherein multiple mixtures converge to represent a single acoustic source.

4.3 Minimum and Maximum Constraints on Covariance Values

Elements of mixture covariance matrices play an important role in the behavior of a GMM during statistical modeling. If mixture covariances become too broad, mixture memberships of sample data may be ambiguous, and the adaptation rate of data-driven parameter estimation may become slow or inaccurate. Conversely, if mixture covariances become too narrow, those mixtures may become effectively marginalized during data-driven parameter estimation. To avoid these issues, intuitive constraints can be applied to diagonal elements of the covariance matrices. Constraining diagonal elements of the covariance matrix will generally require careful handling of off-diagonal elements in order to avoid singular covariance matrices.

5. Inference of Statistical Models

The inference step in back-end statistical modeling involves classifying the underlying acoustic source types corresponding to each GMM mixture, and then extracting probabilistic information regarding the activity of each source.

5.1 Classification of Data Subpopulations

Classification of GMM mixtures requires prior knowledge of the statistical behavior expected for specific acoustic source types in terms of the feature vector elements. Final decisions regarding source classification are made by applying knowledge-based rules to the updated GMM parameters.

Below are examples of feature elements that can be used during back-end modeling, along with the expected statistical behavior of source types with respect to those elements. Further details on the design of feature elements is provided in subsection IV.B and subsection V:

Stationary SNR: The time- and frequency-localized stationary log-domain SNRs can be used to differentiate between stationary noise sources, and non-stationary acoustic sources. Mixtures representing stationary noise sources are expected to include highly negative mean values of this element. Mixtures corresponding to desired sources can be expected to show particularly high stationary SNR mean.

Adaptive noise canceller to blocking matrix ratio: The time- and frequency-localized non-stationary log-domain adaptive noise canceller (e.g., ANC 220, as shown in FIG. 2) to blocking matrix (e.g., ABM 216, as shown in FIG. 2) ratios can be used to differentiate between non-stationary noise sources and desired sources. Mixtures representing non-stationary noise sources are expected to include highly negative mean values of this element. Mixtures corresponding to desired sources can again be expected to show particularly high stationary SNR mean.

Signal to reverberation ratio (SRR): The time- and frequency-localized log-domain SRRs can be used to differentiate between direct-path desired source, and reverberation due to multi-path acoustic propagation. Mixtures representing reverberation are expected to show highly negative mean values of SRR, whereas mixtures representing direct path and other sources are expected to show high mean values.

Echo return loss enhancement (ERLE): The log-domain ERLE can be used to differentiate between acoustic sources originating in the present environment, and those originating from the device speaker. Mixtures representing residual echo are expected to show high ERLE mean values, whereas other sources are expected to show small ERLE mean values. In this particular case, ERLE refers to a short-term or instantaneous ratio of down-link to up-link power, possibly as a function of frequency.

Figure 3A:
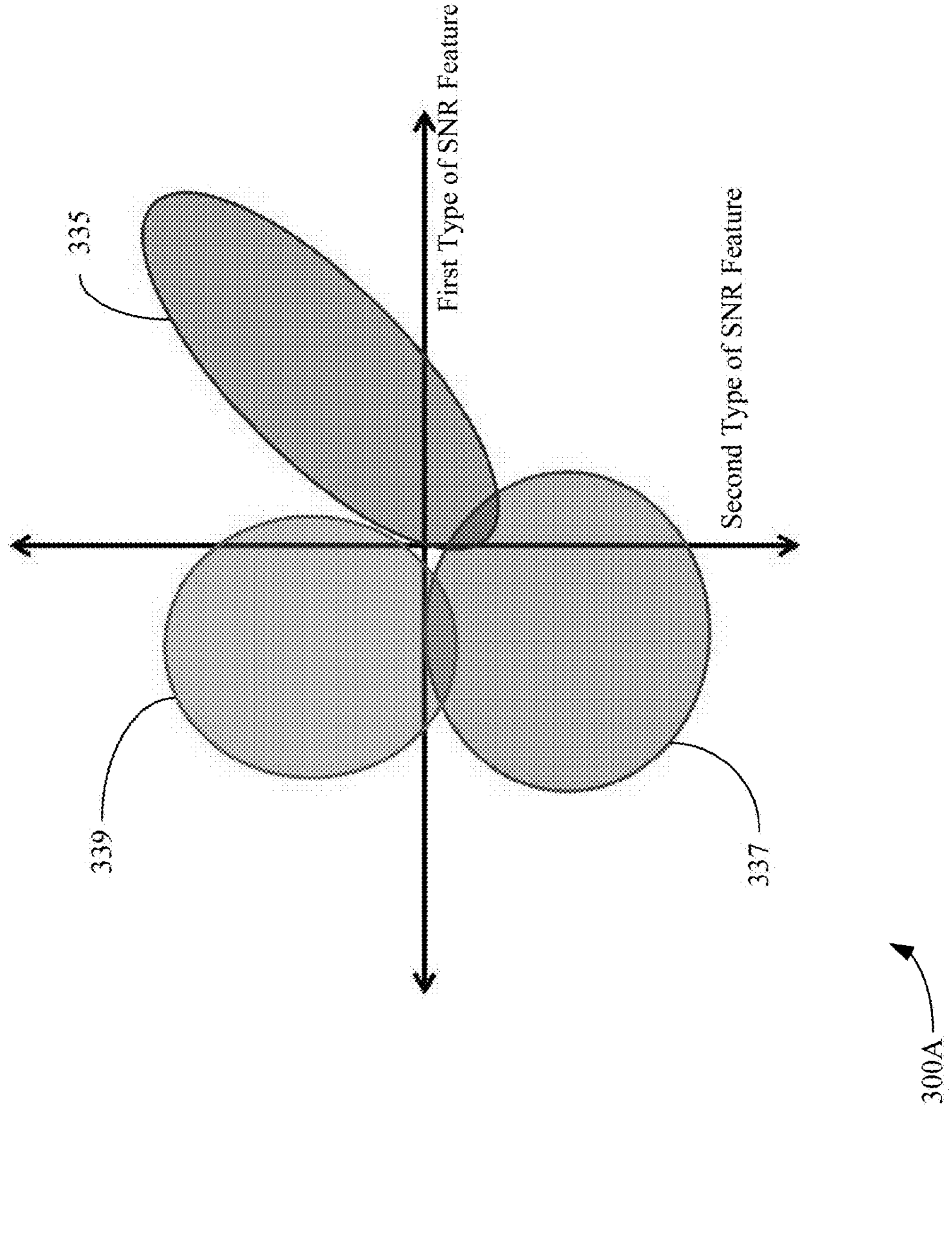
FIG. 3A depicts an example graph that illustrates a 3-mixture 2-dimensional Gaussian mixture model trained on features that comprise adaptive noise canceller to blocking matrix ratios or signal-to-noise ratios, according to an example embodiment.
Figure 3B:
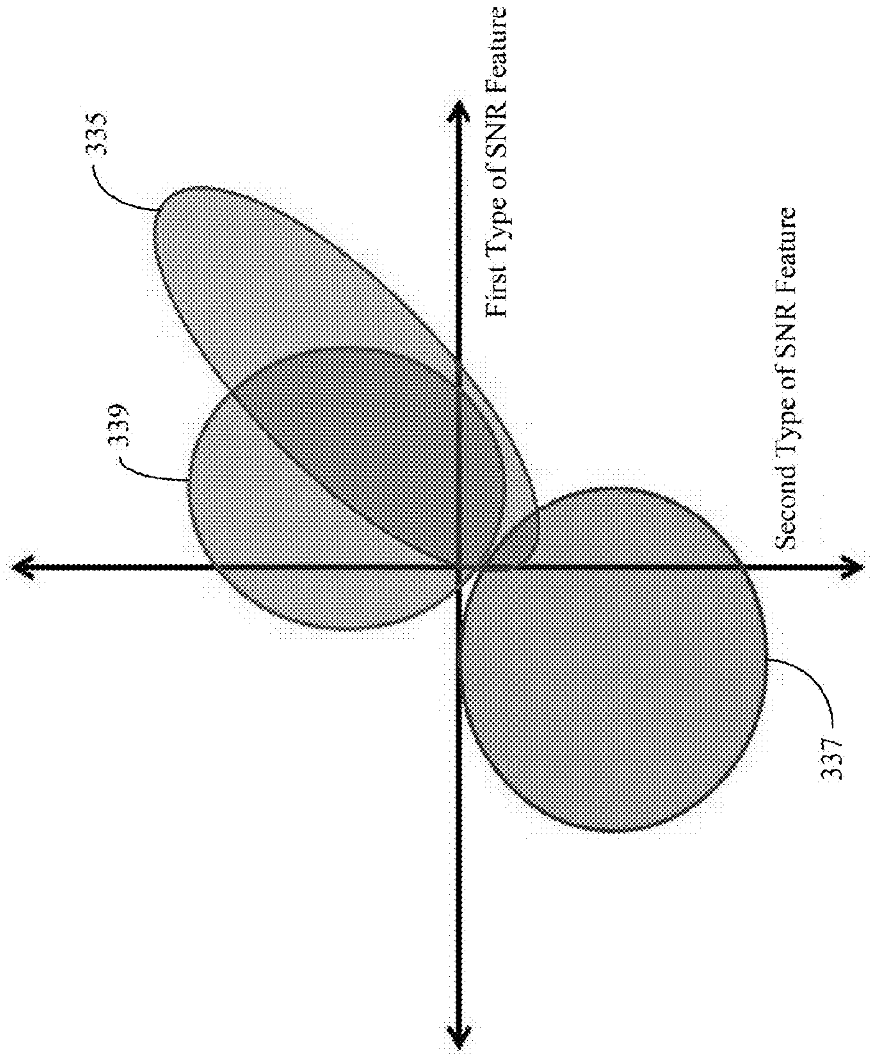
FIG. 3B depicts an example graph that illustrates a 3-mixture 2-dimensional Gaussian mixture model trained on features that comprise adaptive noise canceller to blocking matrix ratios or signal-to-noise ratios, according to another example embodiment.

FIG. 3A illustrates an example graph that illustrates a 3-mixture 2-dimenional GMM trained on features comprised of adaptive noise canceller to blocking matrix ratios or SNRs. Mixtures are shown by contours of a constant pdf. As shown in FIG. 3A, the acoustic sources present are desired source 335, stationary noise 337, and non-stationary noise 339. The parameters of each mixture are consistent with the expected statistical behavior of each source type, as outlined above.

5.2 Estimating the Activity of Acoustic Sources

An objective of statistical modeling in back-end single-channel suppression is to provide probabilistic information regarding the present activity of various sources, which can be used during calculation of the back-end multi-noise source gain rule. Once classification of data subpopulations has been performed, the posterior probabilities of individual source activity, conditioned on the current feature vector, can be estimated by means of Bayes' rule. For example, assume that the GMM mixture m' is classified as representing a particular source of interest. The posterior probability of activity for the source represented by m' is then given by Equation 13, which is shown below:

$$P(m' \mid x_n) = \frac{w_{m'} N(x_n; \mu_{m'}, C_{m'})}{\sum_{j=1}^{M} w_j N(x_n; \mu_j, C_j)}, \quad \text{Equation 13}$$

In certain cases it may be desired to obtain the posterior probability of source inactivity, which is given by Equation 14, which is shown below:

$$\begin{aligned} P(\neg m' \mid x_n) &= 1 - P(m' \mid x_n) \\ &= \frac{\sum_{j=1, j \neq m'}^{M} w_j N(x_n; \mu_j, C_j)}{\sum_{j=1}^{M} w_j N(x_n; \mu_j, C_j)}, \end{aligned} \quad \text{Equation 14}$$

5.3 Refining Source Activity Probabilities with Supplemental Information

The feature vector $x_n$, is designed to include information which may improve separation of acoustic sources in feature space. However, in some cases there exists supplemental information which may be advantageous to use in statistical analysis of acoustic sources, but may not be appropriate for inclusion in the model feature vector.

For example, full-band voice activity detection (VAD) decisions provide valuable information regarding the activity of desired or interfering speakers. Probabilistic VAD outputs can seamlessly be used to refine source activity probabilities from subsection IV.5.2, by assuming statistical independence between $x_n$ and the features used for VAD, and by applying Bayes' rule. Let $P_{vad}$ denote the posterior probability of active speech obtained from a separate VAD system. Further, assume mixture m' represents a source which corresponds to speech (e.g. desired source, interfering speaker, etc.), and let the set θ contain all such mixtures. The refined posterior of m' then becomes:

$$\begin{aligned} P(m' \mid x_n) &= \frac{p(x_n \mid m') \frac{P_{vad}}{1 - P_{vad}}}{\frac{P_{vad}}{1 - P_{vad}} \sum_{j \in \theta} p(x_n \mid m_j) + \frac{1 - P_{vad}}{P_{vad}} \sum_{j \neg\in \theta} p(x_n \mid m_j)}, \\ &= \frac{p(x_n \mid m') P_{vad}^2}{P_{vad}^2 \sum_{j \in \theta} p(x_n \mid m_j) + (1 - P_{vad})^2 \sum_{j \neg\in \theta} p(x_n \mid m_j)} \end{aligned} \quad \text{Equation 15}$$

Another example of supplemental full-band information is the posterior probability of a target speaker provided by a speaker identification (SID) system. This information would be leveraged analogously to Equation 15.

6. Estimating the Reliability of GMM Modeling

As described above, feature elements are chosen to provide separation between acoustic source types during back-end statistical modeling. However, there exist scenarios during which the intended discriminative power of the feature may become insufficient for reliable GMM inference. An example of this is when two or more acoustic sources are physically located relative to the device microphones of a communication device (e.g., communication device 100, as shown in FIG. 1) such that their time differences of arrival (TDOAs) become very similar, and any feature designed to exploit spatial diversity becomes ambiguous. It is then advantageous to recognize the lack of separation provided by this dimension of the GMM, and disable inference related to it.

Error! Reference source not found. illustrates an example graph that illustrates a 3-mixture 2-dimenional GMM trained on features comprised of adaptive noise canceller to blocking matrix ratios or SNRs, similar to Error! Reference source not found. Again, mixtures are shown by contours of a constant pdf, and the acoustic sources present are desired source 335, stationary noise 337, and non-stationary noise 339. As opposed to the example shown in FIG. 3A, the adaptive noise canceller to blocking matrix ratio feature, which is intended to capture spatial diversity of sources, has become ambiguous due to e.g., the physical locations of the acoustic sources.

To estimate the reliability of the GMM in discriminating between specific acoustic sources, the separation between the mixtures representing them is taken into account. Motivated by its well-known interpretation as the expected discrimination information over two hypotheses corresponding to two Gaussian likelihood distributions, the symmetrized Kullback-Leibler (KL) distance is used to quantify this separation. The symmetrized KL distance between mixtures i and j is given by:

$$d_{i,j}^{KL} = \frac{1}{2}[Tr(C_i^{-1}C_j) + Tr(C_j^{-1}C_i) + (\mu_i - \mu_j)^T(C_i^{-1} + C_j^{-1})(\mu_i - \mu_j)], \quad \text{Equation 16}$$

If the covariance matrices of mixtures i and j are assumed to be similar, a reduced complexity approximation becomes:

$$d_{i,j}^{KL} \approx \frac{1}{2}(\mu_i - \mu_j)^T(C_i^{-1} + C_j^{-1})(\mu_i - \mu_j), \quad \text{Equation 17}$$

Having quantified the discriminative power of a GMM with respect to two mixtures, various types of regression may be used to predict GMM reliability. As an example, logistic regression, an example of which is shown below with reference to Equation 18, is appealing since it naturally outputs predictions within the range [0,1]:

$$\text{Reliability}(i, j) = \frac{1}{1 + \exp(-\alpha(d_{i,j}^{KL} - \beta))}, \quad \text{Equation 18}$$

where α and β are constants.

B. Statistical Modeling of Acoustic Sources in a Back-End Single-Channel Suppression System As mentioned above IV.A, back-end statistical modeling may use a single unifying model for all acoustic sources. This allows all statistical correlation between sources to be exploited during the process. However, in certain embodiments, in order to reduce the complexity required by high-dimension, large mixture-number MM modeling is performed with smaller parallel MMs.

Figure 3C:
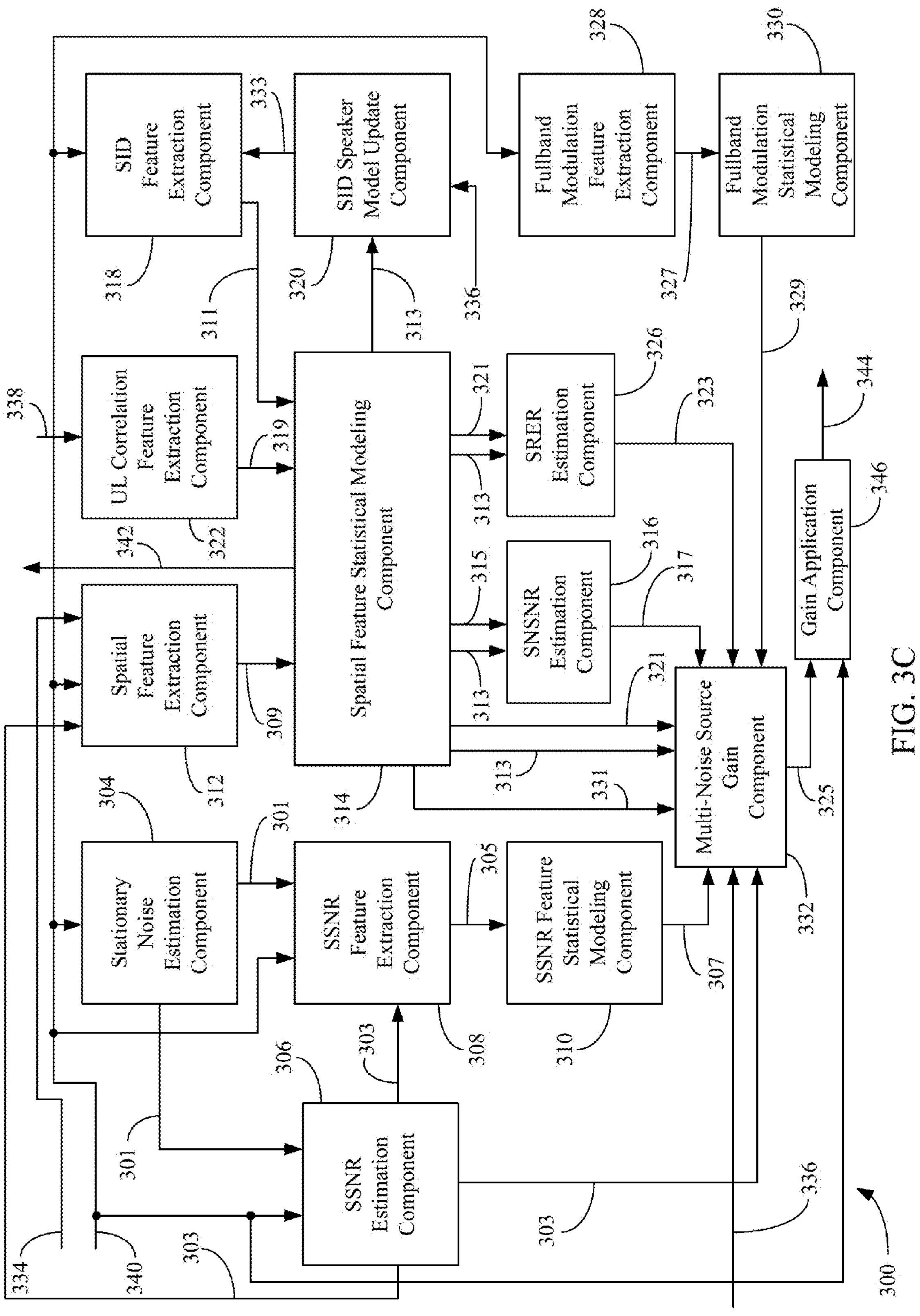
FIG. 3C is a block diagram of a back-end single-channel suppression component, according to an example embodiment.

FIG. 3C is a block diagram of a back-end single-channel suppression (SCS) component 300 that performs noise suppression of multiple types of interfering sources using statistical modeling that has been decoupled into separate parallel branches in accordance with an embodiment. The benefit of multivariate modeling is the ability to capture statistical correlation between features. Therefore, the branches may be configured to cluster features with high inter-feature correlation. The motivation for such a system is that each of the previously mentioned acoustic sources is expected to display specific correlation patterns, thereby improving separation relative to 1-dimenional modeling.

Back-end SCS component 300 is configured to suppress multiple types of interfering sources (e.g., stationary noise, non-stationary noise, residual echo, etc.) present in a first signal 340. Back-end SCS component 300 may be configured to receive first signal 340 and a second signal 334 and provide a suppressed signal 344. In accordance with the embodiments described herein, suppressed signal 344 may correspond to suppressed signal 244, as shown in FIG. 2. First signal 340 may be a suppressed signal provided by a multi-microphone noise reduction (MMNR) component (e.g., MMNR component 114), and second signal 234 may be a noise estimate provided by the MMNR component that is used to obtain first signal 340. Back-end SCS component 300 may comprise an implementation of SCS component 116, as described above in reference to FIGS. 1 and 2. In accordance with such an embodiment, first signal 340 may correspond to enhanced source signal 240 provided by ANC 220 (as shown in FIG. 2), and second signal 334 may correspond to non-desired source signals 234 provided by ABM 216 (as shown in FIG. 2). As shown in FIG. 3C, back-end SCS component 300 includes stationary noise estimation component 304, signal-to-stationary noise ratio (SSNR) estimation component 306, SSNR feature extraction component 308, SSNR feature statistical modeling component 310, spatial feature extraction component 312, spatial feature statistical modeling component 314, signal-to-non-stationary noise ratio (SNSNR) estimation component 316, speaker identification (SID) feature extraction component 318, SID speaker model update component 320, uplink (UL) correlation feature extraction component 322, signal-to-residual echo ratio (SRER) estimation component 326, fullband modulation feature extraction component 328, fullband modulation statistical modeling component 330, multi-noise source gain component 332 and gain application component 346.

Stationary noise estimation component 304, SSNR estimation component 306, SSNR feature extraction component 308 and SSNR feature statistical modeling component 310 may assist in obtaining characteristics associated with stationary noise included in first signal 340, and therefore, may be referred to as being included in a non-spatial (or stationary noise) branch of SCS component 300. Spatial feature extraction component 312, spatial feature statistical modeling component 314, SID feature extraction component 318, SID speaker model update component 320 and SNSNR estimation component 316 may assist in obtaining characteristics associated with non-stationary noise included in first signal 340, and therefore, may be referred to as being included in a spatial (or non-stationary noise) branch of SCS component 300. UL correlation feature extraction component 322, spatial feature statistical modeling component 314 and SRER estimation component 326 may assist in obtaining characteristics associated with residual echo included in first signal 340, and therefore, may be referred to as being included in a residual echo branch of SCS component 300.

1. Non-Spatial Branch

Stationary noise estimation component 304 may be configured to receive first signal 340 and provide a stationary noise estimate 301 (e.g., an estimate of magnitude, power, signal level, etc.) of stationary noise present in first signal 340 on a per-frame basis and/or per-frequency bin basis. In accordance with an embodiment, stationary noise estimation component 304 may determine stationary noise estimate 301 by estimating statistics of an additive noise signal included in first signal 340 during non-desired source segments. In accordance with such an embodiment, stationary noise estimation component 304 may include functionality that is capable of classifying segments of first signal 340 as desired source segments or non-desired source segments. Alternatively, stationary noise estimation component 304 may be connected to another entity that is capable of performing such a function. Of course, numerous other methods may be used to determine stationary noise estimate 301. Stationary noise estimate 301 is provided to SSNR estimation component 306 and SSNR feature extraction component 308.

SSNR estimation component 306 may be configured to receive first signal 340 and stationary noise estimate 301 and determine a ratio between first signal 340 and stationary noise estimate 301 to provide an SSNR estimate 303 on a per-frame basis and/or per-frequency bin basis. In accordance with an embodiment, SSNR estimate 303 may be equal to a measured characteristic (e.g., magnitude, power, signal level, etc.) of first signal 340 divided by stationary noise estimate 301. SSNR estimate 303 is provided to SSNR feature extraction component 308 and multi-noise source gain component 332. As will be described below, SSNR estimate 303 may be used to determine an optimal gain 325 that is used to suppress noise from first signal 340.

SSNR feature extraction component 308 may be configured to extract one or more SNR feature(s) from first signal 340 based on stationary noise estimate 301 on a per-frame basis and/or per-frequency bin basis to obtain an SNR feature vector 305. In accordance with an embodiment, to form SNR feature(s), a preliminary (rough) estimate of the desired source power spectral density may be obtained. The estimate of the desired source power spectral density may be obtained through conventional methods or according to the methods in described in aforementioned U.S. patent application Ser. No. 12/897,548, the entirety of which has been incorporated by reference as if fully set forth herein. In accordance with another embodiment, the estimate of the SNR feature(s) is equivalent to the a priori SNR that is estimated simply as the posteriori SNR minus one (assuming statistical independence between interfering and desired sources). In accordance with yet another embodiment, the various SNR feature forms could include various degrees of smoothing the power across frequency prior to forming the SNR feature(s).

In accordance with an embodiment, before extracting features from first signal 340, SSNR feature extraction component 308 may be configured to apply preliminary single-channel noise suppression to first signal 340. For example, SSNR feature extraction component 308 may suppress single-channel noise from first signal 340 based on SSNR estimate 303. SSNR feature extraction component 308 may also be configured to down-sample the preliminary noise-suppressed first signal and/or stationary noise estimate 301 to reduce the sample sizes thereof, thereby reducing computational complexity. SNR feature vector 305 is provided to SSNR feature statistical modeling component 310.

SSNR feature statistical modeling component 310 may be configured to model feature vector 305 on a per-frame basis and/or per-frequency bin basis. In accordance with an embodiment, SSNR feature statistical modeling component 310 models SNR feature vector 305 using GMM modeling. By using GMM modeling, a probability 307 that a particular frame of first signal 340 is from a desired source (e.g., speech) and/or a probability that the particular frame of first signal 340 is from a non-desired source (e.g., an interfering source, such as stationary background noise) may be determined for each frame and/or frequency bin.

For example, stationary noise can be separated from the desired source by exploiting the time and frequency separation of the sources. The restriction to stationary sources arises from the fact that the interfering component is estimated during desired source absence and then assumed stationary, and hence maintaining its power spectral density during desired source presence. This allows for estimation of the (stationary) interfering source power spectral density from which the SNR feature(s) can then be formed. It reflects the way traditional single channel noise suppression works, and the interfering source power spectral density can be estimated with such traditional methods. The (stationary) interfering source presence can then be modelled with GMM-based SNR feature vector 305, which comprises various forms of SNRs.

In accordance with an embodiment, two Gaussian mixtures are used to model SNR feature vector 305 (i.e., a 2-mixture GMM), and the Gaussian mixture with the lowest (average in case of multiple SNR features) mean parameter (lowest SNR) corresponds to the interfering (stationary) source, and the Gaussian mixture with the highest (average) mean parameter corresponds to the desired source. With the inference in place, i.e., the association of Gaussian mixtures with sources, it is possible to calculate the probabilities of desired source and probability of interfering (stationary) source in accordance Equations 13, 14 and/or 15, as described above in subsections IV.A.5.2 and IV.A.5.3.

Figure 3D:
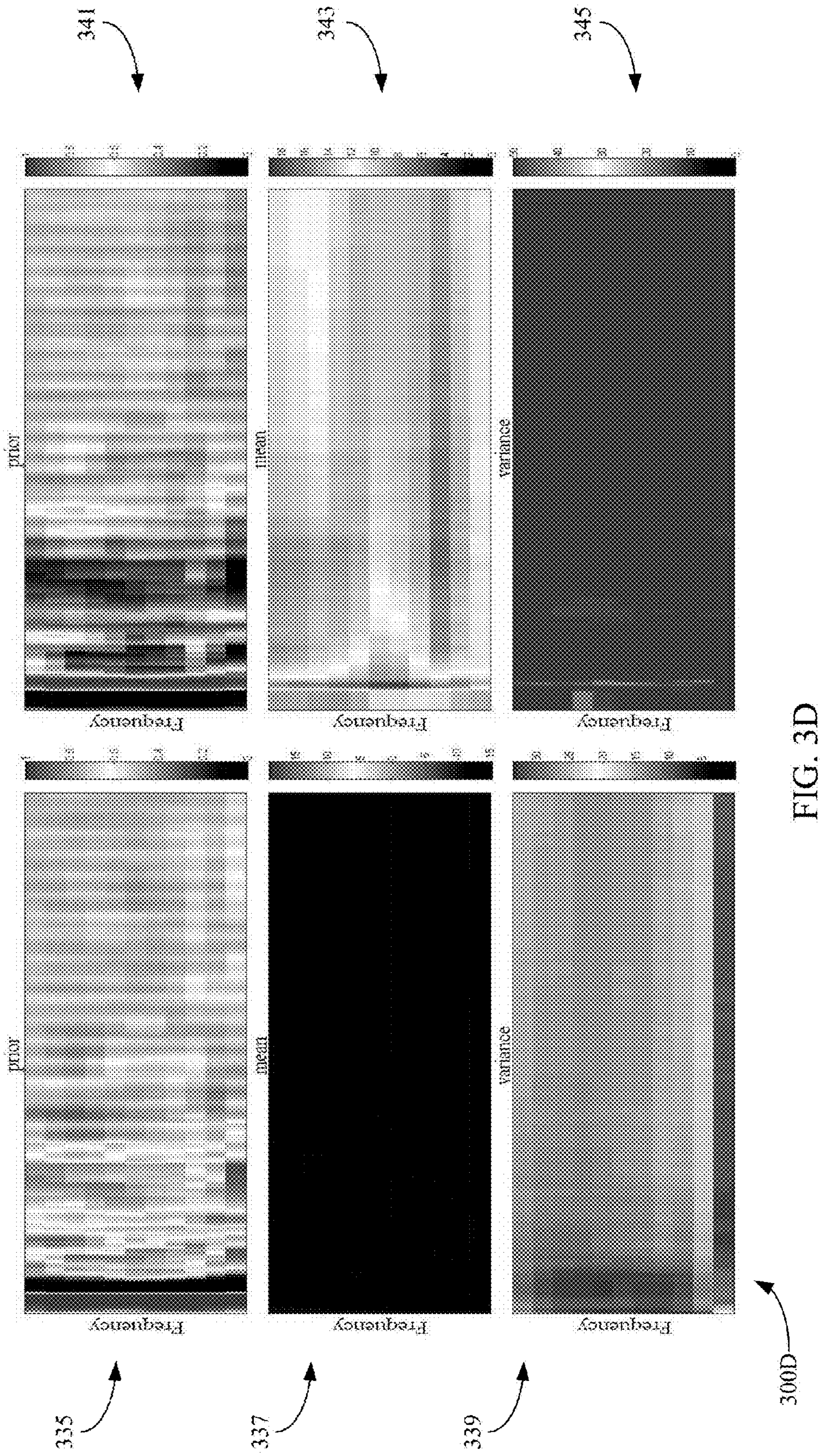
FIG. 3D depicts example diagnostic plots of 1-dimensional 2-mixture Gaussian mixture model parameters during online parameter estimation of a signal-to-noise feature vector, according to an example embodiment.

FIG. 3D shows example diagnostic plots of 1-dimensional 2-mixture GMM parameters during online parameter estimation of GMM modeling of the SNR feature vector 305. In FIG. 3D, initial segments of a signal (e.g., first signal 340) that includes speech and pub noise are depicted, during which parameters are converging to the acoustic environment. The left column corresponds to the interfering source mixture corresponding to the pub noise, whereas the right column corresponds to the desired source mixture corresponding to the speech. Plots 335, 337 and 339 show mixture priors, means, and variances, respectively, associated with the interfering source mixture, and plots 341, 343 and 345, show the mixture priors, means, and variances, respectively, associated with the desired source mixture.

Unlike subsection IV.B.2 (which is described below), the SNR feature does not require multiple microphones (or channels), and it applies equally to single microphone (channel) or multi-microphone (multi-channel) applications.

As an example, only a single feature is used (per frequency bin in the frequency domain), with a mild smoothing. Let the preliminary estimate of desired source power spectral density after pre-noise suppression be:

$$|Y_{pre,m}(k)|^2,\ k = 0, 1, \ldots, \frac{N_{fft}}{2}, \qquad \text{Equation 19}$$

and the interfering source power spectral density be:

$$|S_m(k)|^2,\ k = 0, 1, \ldots, \frac{N_{fft}}{2}, \qquad \text{Equation 20}$$

where k is the frequency index, m is the frame index, and $N_{fft}$ is the FFT size, e.g. 256. The SNR associated with a frequency index is then calculated as:

$$SNR_m(k) = 10\log_{10}\left(\frac{\sum_{k_{win}=k-K}^{k+K} |Y_{pre,m}(k_{win})|^2}{\sum_{k_{win}=k-K}^{k+K} |S_m(k_{win})|^2}\right), \quad k = 0, 1, \ldots, \frac{N_{fft}}{2}, \qquad \text{Equation 21}$$

where K determines the smoothing range, e.g., 2. Equation 21 represents a rectangular window, but, in certain embodiments, an alternate window may be used instead in accordance with embodiments. The SNR forms the single feature (i.e., SNR feature vector 305) that is modelled independently for every frequency index k in order to estimate the probability of desired source, $P_{DS,m}(k)$ (i.e., probability 307), versus the probability of interfering (stationary) source, $P_{IS,m}(k)$, for every frequency index.

Figure 3E:
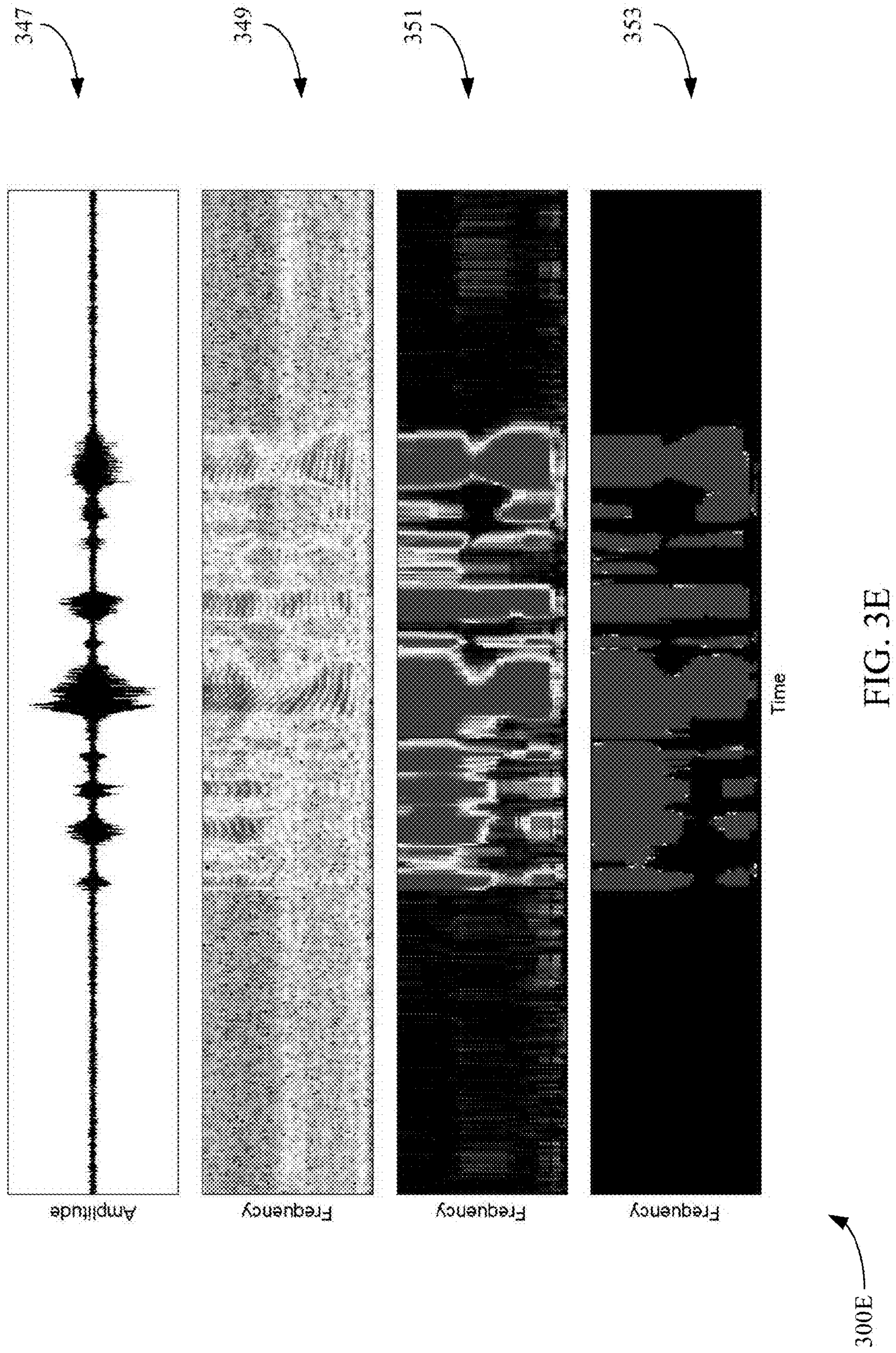
FIG. 3E depicts example plots associated with an input signal that includes speech and car noise, according to an example embodiment.

An example of a waveform of an input signal that includes speech and car noise (e.g., first signal 340), time-frequency plots of the input signal, the SNR feature (i.e., SNR feature vector 305), and the resulting $P_{DS,m}(k)$ (i.e., probability 307)

are shown in Error! Reference source not found.E. For example, as shown in FIG. 3E, plot 347 represents a time domain input waveform representing first signal 340 (which includes both speech and car noise), plot 349 represents a time-frequency plot of first signal 340, plot 351 represents SNR feature vector 305, which is being modelled using GMM modeling, and plot 353 represents a probability of desired source (i.e., probability 307) with respect to car noise obtained using GMM modeling.

In an embodiment where first signal 340 is down-sampled by SSNR feature extraction component 308, SSNR feature statistical modeling component 310 up-samples probability 307. Probability 307 is provided to multi-noise source gain component 332. As will be described below, probability 307 may be used to determine optimal gain 325, which is used to suppress stationary noise (and/or other types of interfering sources) present in first signal 340 on a per-frame basis and/or per-frequency bin basis.

2. Spatial Branch

Spatial feature extraction component 312 may be configured to extract spatial feature(s) from first signal 340 and second signal 334 on a per-frame basis and/or per-frequency bin basis. The feature(s) may be a ratio 309 between first signal 340 and second signal 334. In accordance with an embodiment where back-end SCS component 300 comprises an implementation of SCS component 116, ratio 309 corresponds to a ratio between enhanced source signal 240 provided by ANC 220 and non-desired source signals 234 provided by ABM 216. By forming a ratio between the output of ANC 220 (i.e., enhanced source signal 240) and the output of ABM 216 (i.e., non-desired source signals 234), both by means of the linear spatial processing of the front-end, a feature indicating the presence of desired source vs. interfering source (from a spatial perspective) is obtained (i.e., an ANC 220 to ABM 216 ratio, or simply Anc2AbmR).

Unlike SNR feature vector 305 of subsection IV.B.1, ratio 309 separates non-stationary interfering sources from a desired source. Hence, it is used for non-stationary noise suppression. Ratio 309 can be calculated on a frequency bin or range basis in order to provide frequency resolution, and smoothing to a varying degree can be carried out in order to achieve a multi-dimensional feature vector that captures both local strong events as well as broader weaker events. Ratio 309 is greater for desired source presence and smaller for interfering source presence.

The formation of ratio 309 may require at least two microphones and the presence of a generalized sidelobe canceller (GSC)-like front-end spatial processing stage. However, a similar "spatial" ratio can be formed with the use of many other front-ends, and in some applications a front-end is not even necessary. An example of that is the case where the position of the desired source relative to the two microphones provides a significant level (possibly frequency dependent) difference on the two microphones while all interfering sources can be assumed to be far-field, and hence provide approximately similar level on the two microphones. Such a scenario is present when a communication device 100 as shown in FIG. 1 is handheld next to the face as in conventional telephony use, with one microphone at the bottom of communication device 100 (i.e., microphone $\mathbf{106_1}$) near the mouth, and another microphone at the upper back part communication device 100 (i.e., microphone $\mathbf{106_N}$). While interfering sources of environmental ambient acoustic noise will have approximately similar levels on the two microphones, the desired source (e.g., speech of the user) will be in the order of 10 dB higher at the bottom microphone than compared to the upper back microphone. In this case, ratio 309 can be formed directly from the two microphone signals.

In accordance with an embodiment, before obtaining ratio 309, spatial feature extraction component 312 applies preliminary single-channel noise suppression to first signal 340. For example, spatial feature extraction component 312 may suppress single-channel noise present in first signal 340 based on SNR estimate 303. This suppression should not be too strong as it will then render this modeling very similar to the stationary SNR modeling described above in subsection IV.B.1. However, a mild suppression will aid the convergence of the parameters of the online GMM modeling (as described below), preventing divergence of the modeling by guiding it in a proper direction. An example value of preliminary target suppression is 6 dB.

Spatial feature extraction component 312 may also be configured to down-sample the preliminary noise-suppressed first signal and/or second signal 334 to reduce the sample sizes thereof, thereby reducing computational complexity. Ratio 309 is provided to spatial feature statistical modeling component 314.

An example of obtaining ratio 309 is described with respect to Equations 22-24 below. Let the power spectral density of the preliminary noise suppressed output of ANC 220 (i.e., first signal 340) be:

$$|Y_{ANC,m}(k)|^2,\ k=0,1,\ \ldots\ ,\frac{N_{fft}}{2}, \qquad \text{Equation 22}$$

and the power spectral density of the output of ABM 216 (i.e., second signal 334) be $$|Y_{BM,m}(k)|^2,\ k=0,1,\ \ldots\ ,\frac{N_{fft}}{2}, \qquad \text{Equation 23}$$

where k is the frequency index, m is the frame index, and $N_{fft}$ is the FFT size, e.g. 256. The Anc2AbmR (i.e., ratio 309) associated with a frequency index is then calculated as:

$$Anc2AbmR_m(k)=10\log_{10}\left(\frac{\sum_{k_{win}=k-K}^{k+K}|Y_{ANC,m}(k_{win})|^2}{\sum_{k_{win}=k-K}^{k+K}|Y_{BM,m}(k_{win})|^2}\right),\quad k=0,1,\ \ldots\ ,\frac{N_{fft}}{2},, \qquad \text{Equation 24}$$

where K determines the smoothing range, e.g. 2. Equation 24 represents a rectangular window, but similar to subsection IV.B.1, in certain embodiments, an alternate window may be used instead. The Anc2AbmR may form the single feature that is modelled independently for every frequency index k in order to estimate the probability of desired source, $P_{DS,m}(k)$, versus the probability of interfering (spatial) source, $P_{IS,m}(k)$, for every frequency index (as described below with reference to spatial feature statistical modeling component 314).

SID feature extraction component 318 may be configured to extract features from first signal 340 and provide a classification 311 (e.g., a soft or hard classification) of first signal 340 based on the extracted features on a per-frame basis and/or per-frequency bin basis. Such features may include, for example, reflection coefficients (RCs), log-area ratios (LARs), arcsin of RCs, line spectrum pair (LSP) frequencies, and the linear prediction (LP) cepstrum.

Classification 311 may indicate whether a particular frame and/or frequency bin of first signal 340 is associated with a target speaker. For example, classification 311 may be a probability as to whether a particular frame and/or frequency bin is associated with a target speaker or a non-desired source (i.e., the supplemental full-band information described above in subsection IV.A.5.3), where the higher the probability, the more likely that the particular frame and/or frequency bin is associated with a target speaker. Back-end SCS component 300 may include a speaker identification component (or may be coupled to a speaker identification component) that assists in determining whether a particular frame and/or frequency bin of first signal 340 is associated with a target speaker. For example, the speaker identification component may include GMM-based speaker models. The feature(s) extracted from first signal 340 may be compared to these speaker models to determine classification 311. Further details concerning SID-assisted audio processing algorithm(s) may be found in commonly-owned, co-pending U.S. patent application Ser. No. 13/965,661, entitled "Speaker-Identification-Assisted Speech Processing Systems and Methods" and filed on Aug. 13, 2013, U.S. patent application Ser. No. 14/041,464, entitled "Speaker-Identification-Assisted Downlink Speech Processing Systems and Methods" and filed on Sep. 30, 2013, and U.S. patent application Ser. No. 14/069,124, entitled "Speaker-Identification-Assisted Uplink Speech Processing Systems and Methods" and filed on Oct. 31, 2013, the entireties of which are incorporated by reference as if fully set forth herein. Classification 311 is provided to spatial feature statistical modeling component 314.

Spatial feature statistical modeling component 314 may be configured to determine and provide a probability 313 that a particular feature of a particular frame and/or frequency bin of first signal 340 is from a desired source and a probability 315 that a particular feature of a particular frame and/or frequency bin of first signal 340 is from a non-desired source (e.g., non-stationary noise). Probabilities 313 and 315 may be based on ratio 309. Probability 313 and/or probability 315 may be also be based on classification 311. Ratio 309 may be modelled using a GMM. The Gaussian distributions of the GMM can be associated with interfering non-stationary sources and the desired source according to the GMM mean parameters based on inference, thereby allowing calculation of probability 315 and probability 313 from ratio 309 and the parameters of respective GMMs associated with interfering non-stationary sources and the desired source.

At least one mixture of the GMM may correspond to a distribution of a particular type of a non-desired source (e.g., non-stationary noise), and at least one other mixture of the GMM may correspond to a distribution of a desired source. It is noted that the GMM may also include other mixtures that correspond to other types of interfering, non-desired sources.

To determine which mixture corresponds to the desired source and which mixture corresponds to the non-desired source, spatial features statistical modeling component 314 may monitor the mean associated with each mixture. The mixture having a relatively higher mean equates to the mixture corresponding to a desired source, and the mixture having a relatively lower mean equates to the mixture corresponding to a non-desired source.

Figure 3F:
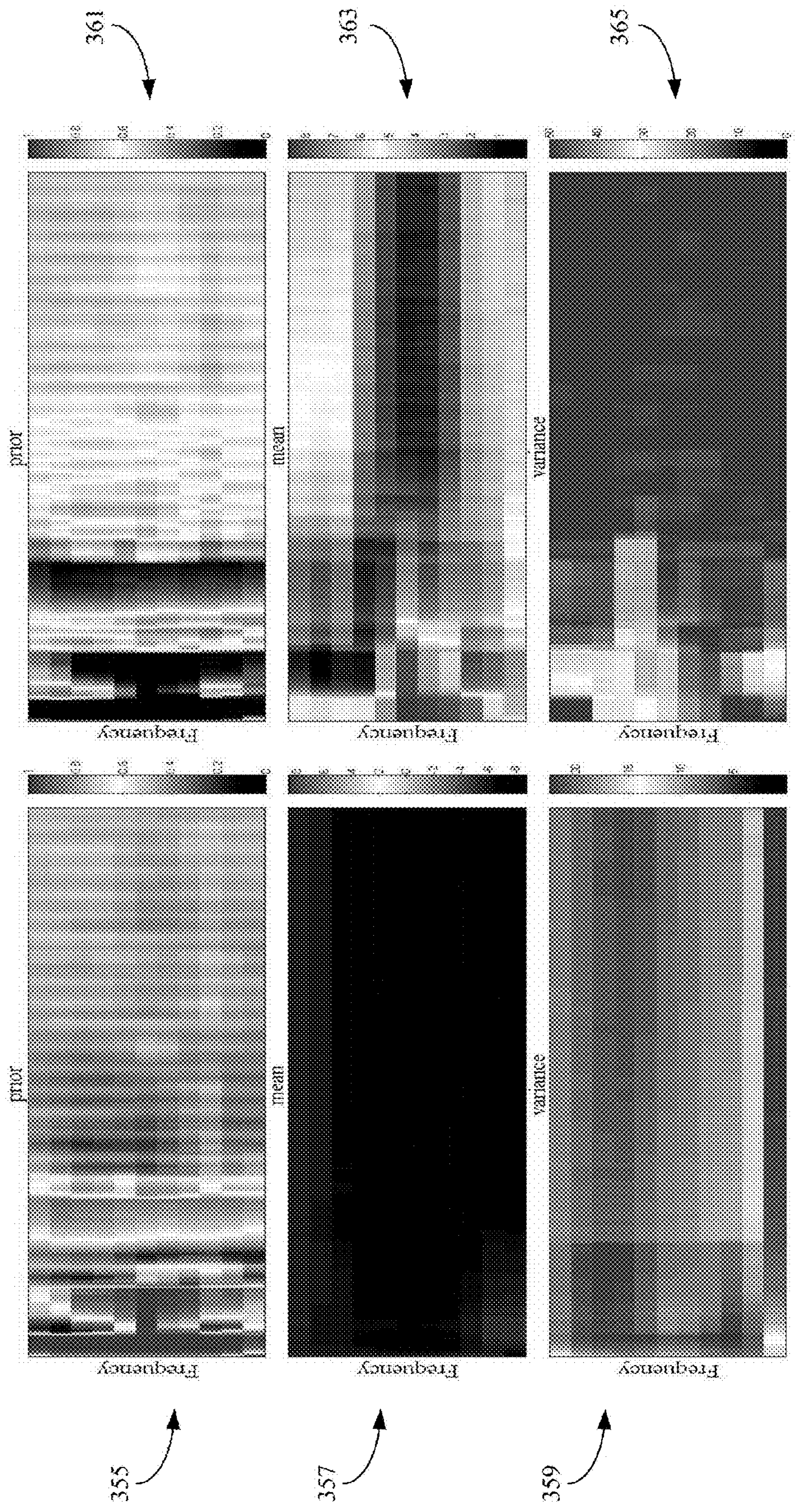
FIG. 3F depicts example diagnostic plots of 1-dimensional 2-mixture Gaussian mixture model parameters during online parameter estimation of an adaptive noise canceller to blocking matrix ratio, according to an example embodiment.

FIG. 3F shows example diagnostic plots of 1-dimensional 2-mixture GMM parameters during online parameter estimation of the GMM modeling of the Anc2AbmR (i.e., ratio 309). In FIG. 3F, initial segments of a signal (e.g., first signal 340) that includes speech and pub noise are depicted, during which parameters are converging to the acoustic environment. The left column corresponds to the interfering source mixture corresponding to the pub noise, whereas the right column corresponds to the desired source mixture corresponding to the desired source. Plots 355, 357 and 359 show mixture priors, means, and variances, respectively, associated with the interfering source mixture, and plots 361, 363 and 365 show the mixture priors, means, and variances, respectively, associated with the desired source mixture.

In accordance with an embodiment, probabilities 313 and 315 may be based on a ratio between the mixture associated with the desired source and the mixture associated with the non-desired source. For example, probability 313 may indicate that a particular feature of a particular frame and/or frequency bin of first signal 340 is from a desired source if the ratio is relatively high, and probability 315 may indicate that a particular feature of a particular frame and/or frequency bin of first signal 340 is from a non-desired source if the ratio is relatively low. In accordance with an embodiment, the ratios may be determined for a plurality of ranges for smoothing across frequency. For example, a wideband smoothed ratio and a narrowband smoothed ratio may be determined. In accordance with such an embodiment, probabilities 313 and 315 are based on a combination of these ratios. Probabilities 313 and 315 are provided to SNSNR estimation component 316.

Figure 3G:
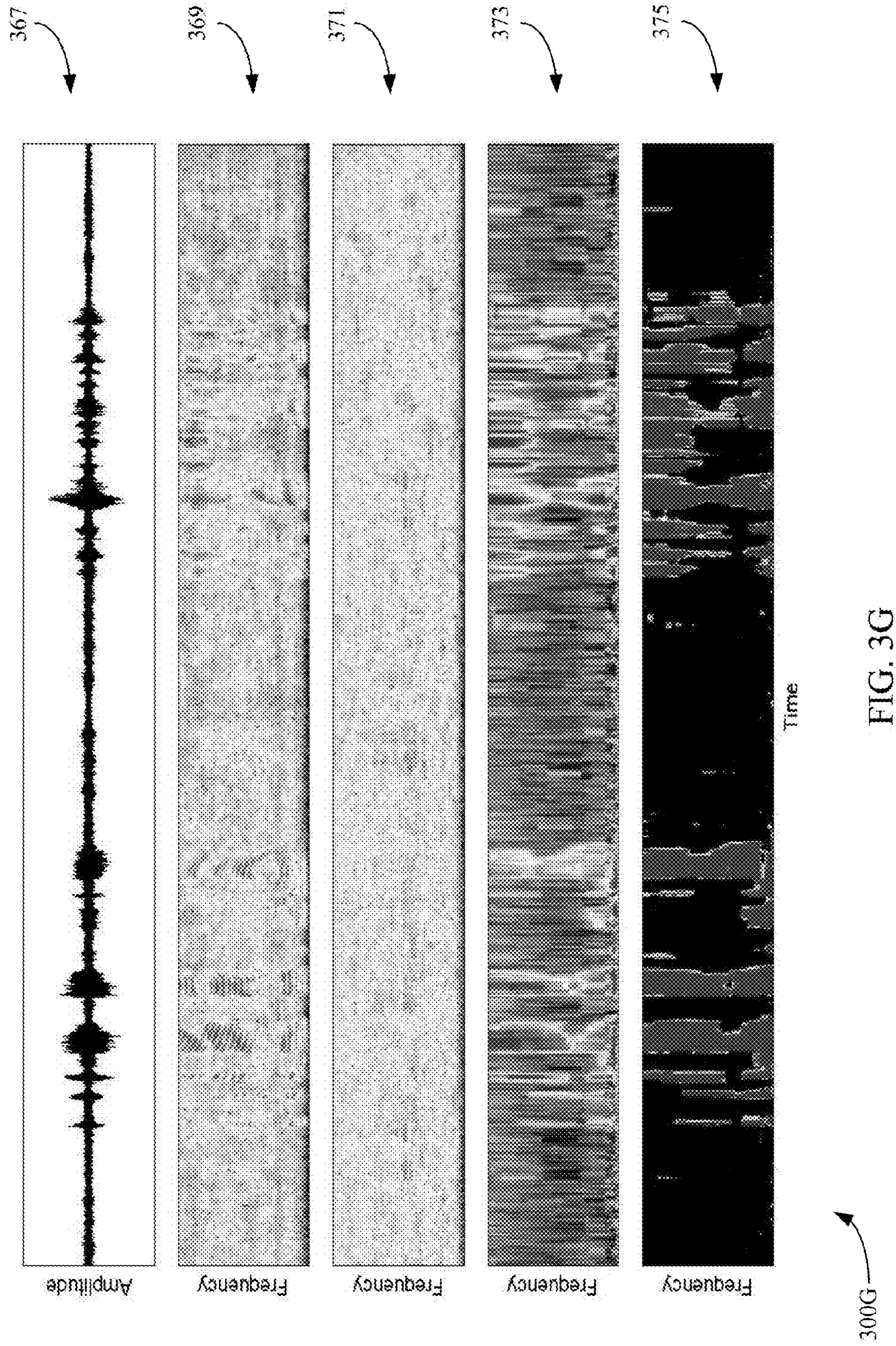
FIG. 3G depicts example plots associated with an input signal that includes speech and car noise, according to another example embodiment.

An example of a waveform of an input signal (e.g., first signal 340) that includes speech an non-stationary noise (e.g., babble noise), time-frequency plots of the input signal, the Anc2AbmR feature (i.e., ratio 309), and the resulting $P_{DS,m}(k)$ (i.e., probability 313) for speech in an environment that includes non-stationary noise, are shown in FIG. 3G. This is a type of interfering source where SNR feature vector 305 of subsection IV.B.1 traditionally may not provide good separation.

As shown in FIG. 3G, plot 367 represents a time domain input waveform representing first signal 340, plot 369 represents a time-frequency plot of first signal 340, plot 371 represents an output of ABM 216 (i.e., second signal 334), plot 373 represents the Anc2AbmR (i.e., ratio 309) being modelled using GMM modeling, and plot 375 represents a probability of desired source (i.e., probability 313) with respect to babble noise obtained using GMM modeling. As can be seen from FIG. 3G, the Anc2AbmR feature (i.e., ratio 309) provides excellent separation despite the interfering source being non-stationary.

It could be speculated that SNR feature vector 305 of subsection IV.B.1 may be obsolete given the Anc2AbmR feature. However, in practice, there are cases where the modeling of the Anc2AbmR is ambiguous. This can be due to slower convergence of the Anc2AbmR modeling or due to the microphone signals of the acoustic scene not providing sufficient spatial separation. Hence, the SNR feature vector and Anc2AbmR features complement each other, although there is also some overlap.

Spatial feature statistical modeling component 314 may also be configured to determine and provide a measure of spatial ambiguity 331 on a per-frame basis and/or a per-frequency bin basis. Measure of spatial ambiguity 331 may be indicative of how well spatial feature statistical modeling component 314 is able to distinguish a desired source from non-stationary noise in the acoustic scene. Measure of spatial ambiguity 331 may be determined based on the means for each of the mixtures of the GMM modelled by spatial feature statistical modeling component 314. In accordance with such an embodiment, if the mixtures of the GMM are not easily separable (i.e., the means of each mixture are relatively close to one another such that a particular mixture cannot be associated with a desired source or a non-desired source (e.g., non-stationary noise), the value of measure of spatial ambiguity 331 may be set such that it is indicative of spatial feature statistical modeling component 314 being in a spatially ambiguous state. In contrast, if the mixtures of the GMM are easily separable (i.e., the mean of one mixture is relatively high, and the mean of the other mixture is relatively low), the value of measure of spatial ambiguity 331 may be set such that it is indicative of spatial feature statistical modeling component 314 being in a spatially unambiguous state, i.e., in a spatially confident state.

In accordance with an embodiment, measure of spatial ambiguity 331 is determined in accordance with Equation 25, which is shown below:

$$\text{Measure of Spatial Ambiguity}=(1+e^{(\alpha(d-\beta))})^{-1}, \qquad \text{Equation 25}$$

where d corresponds to the distance between the mean of the mixture associated with the desired source and the mean of the mixture associated with the non-desired source and α and β are user-defined constants which control the distance to spatial ambiguity mapping.

As will be described below, in response to determining that spatial feature statistical modeling component 314 is in a spatially ambiguous state, non-stationary noise suppression may be soft-disabled.

In accordance with an embodiment, in response to determining that spatial feature statistical modeling component 314 is in a spatially ambiguous state, spatial feature statistical modeling component 314 provides a soft-disable output 342, which is provided to MMNR component 114 (as shown in FIG. 2). Soft-disable output 342 may cause one or more components and/or sub-components of MMNR component 114 to be disabled. In accordance with such an embodiment, soft-disable output 342 may correspond to soft-disable control signal 242, as shown in FIG. 2.

Spatial feature statistical modeling component 314 may further provide probability 313 to SID speaker model update component 320. SID speaker model update component 320 may be configured to update the GMM-based speaker model(s) based on probability 313 and provide updated GMM-based speaker model(s) 333 to SID feature extraction component 318. SID feature extraction component 318 may compare feature(s) extracted from subsequent frame(s) of first signal 340 to updated GMM-based speaker model(s) 333 to provide classification 311 for the subsequent frame(s).

In accordance with an embodiment, SID speaker model update component 320 updates the GMM-based speaker model(s) based on probability 313 when back-end SCS component 300 operates in handset mode. When operating in speakerphone mode, updates to the GMM-based speaker model(s) may be controlled by information available from the acoustic scene analysis in the front end. In accordance with such an embodiment, back-end SCS component 300 receives a mode enable signal 336 from a mode detector (e.g., automatic mode detector 222, as shown in FIG. 2) that causes SCS system 300 to switch between single-user or conference speakerphone mode. Accordingly, mode enable signal 336 may correspond to mode enable signal 236, as shown in FIG. 2.

SNSNR estimation component 316 may determine an SNSNR estimate 317 based on probability 313 and probability 315 on a per-frame basis and/or per-frequency bin basis. For example, when assuming that $x=x_{DS}+x_{IS}$, where x corresponds to first signal 340, $x_{DS}$ corresponds to the underlying desired source in x and $x_{IS}$ corresponds to an interfering source (e.g., non-stationary noise) in x, SNSNR estimate 317 may be determined in accordance to Equation 26:

$$SNSNR \approx \frac{E\{x_{DS}^2 \mid y\}}{E\{x_{IS}^2 \mid y\}} = \frac{x^2 P(H_{DS} \mid y)}{x^2 P(H_{IS} \mid y)} = \frac{P(y \mid H_{DS})}{P(y \mid H_{IS})}, \qquad \text{Equation 26}$$

where y is a particular extracted feature and $P(y|H_{DS})$ corresponds to probability 313 (i.e., the likelihood of feature y given the desired source hypothesis) and $P(y|H_{IS})$ corresponds to probability 315 (i.e., the likelihood of feature y given the interfering source hypothesis). SNSNR estimate 317 is provided to multi-noise source gain component 332. As will be described below, SNSNR estimate 317 may be used determine optimal gain 325, which is used to suppress non-stationary noise (and/or other types of interfering sources) present in first signal 340.

3. Residual Echo Suppression Branch

Residual echo suppression is used to suppress any acoustic echo remaining after linear acoustic echo cancellation. This need is typically greatest when a device is operated in speakerphone mode, i.e., when the device is not handheld in a typical telephony handset use mode of operation. In speakerphone mode, the far-end signal (also referred as the downlink signal) is played back on a loudspeaker (e.g., loudspeaker 108, as shown in FIG. 1) on a device (e.g., communication device 100, as shown in FIG. 1) at a level that, seen from the perspective of the microphone(s) (e.g., microphones $\mathbf{106}_{1-N}$, as shown in FIG. 1), may be louder than the near-end signal (also referred as the uplink signal), including the desired source. This makes the acoustic echo cancellation a difficult problem, often with significant residual echo that must be suppressed. Traditionally, this is carried out by means of estimating the ERL (Echo Return Loss) of the acoustic channel from the downlink to the uplink, and the ERLE (Echo Return Loss Enhancement) of the linear acoustic echo canceller. With knowledge of the downlink signal, the ERL, and the ERLE, an estimate of the residual echo level can be calculated. Such an estimate can be used to estimate a SRER feature much like SNR feature vector 305 is estimated in subsection IV.B.1. In accordance with an embodiment, non-linear residual echo is identified by measuring the normalized correlation in the uplink signal after linear echo cancellation at the pitch period of the downlink signal. Moreover, this can be measured as a function of frequency in order to exploit spectral separation between the residual echo and the desired source.

The normalized correlation of the uplink signal at the pitch period of the downlink signal may be able to identify residual echo components that are harmonics of the downlink pitch periods, and may not be able to identify any unvoiced residual echo components. This is, however, acceptable as non-linear residual echo is typically non-linear components triggered by the high energy components of the downlink signal (i.e., voiced speech). Moreover, strong residual echo is often a result of strong non-linearities being excited by voiced components, and typically manifests itself as pitch harmonics of the downlink signal being repeated up through the spectrum, producing pitch harmonics where the downlink signal had no or only weak harmonics.

Accordingly, in embodiments, UL correlation feature extraction component 322 may be configured to determine an uplink correlation at a downlink pitch period. For example, UL correlation feature extraction component 322 may determine a measure of correlation 319 in an FDAEC output signal (e.g., FDAEC output signal 224, as shown in FIG. 2) at the pitch period of a downlink signal (e.g., downlink signal 202, as shown in FIG. 2) as a function of frequency, where a relatively high correlation is an indication of residual echo presence in first signal 340 and a relatively low correlation is an indication of no residual echo presence in first signal 340.

The following outlines and provides an example of the feature calculation and modeling of the normalized uplink correlation at the downlink pitch period (i.e., measure of correlation 319). Let the (full-band) downlink pitch period be denoted $L_{DL}$, and let the frequency domain output of the linear acoustic echo cancellation be:

$$Y_{AEC,m}(k),\ k=0,1,\ldots,\frac{N_{fft}}{2},\qquad \text{Equation 27}$$

where, k is the frequency index, m is the frame index, and $N_{fft}$ is the FFT size, e.g. 256. The inverse Fourier transform of the power spectrum is the autocorrelation, and hence the correlation at a given lag, L, can be found as the inverse Fourier transform of $|Y_{AEC,m}(k)|^2$ at lag L:

$$C_{UL}(L)=\sum_{k=0}^{N_{fft}}|Y_{AEC,m}(k)|^2\cdot e^{\frac{j2\pi kL}{N_{fft}}},\qquad \text{Equation 28}$$

From here the normalized correlation at the downlink pitch period is calculated as:

$$C_{N,UL}(L_{DL})=\frac{C_{UL}(L_{DL})}{C_{UL}(0)}=\frac{\sum_{k=0}^{N_{fft}}|Y_{AEC,m}(k)|^2\cdot e^{\frac{j2\pi kL_{DL}}{N_{fft}}}}{\sum_{k=0}^{N_{fft}}|Y_{AEC,m}(k)|^2},\qquad \text{Equation 29}$$

This is a full-band measure of the normalized correlation, and as outlined above it is desirable to characterize the presence of residual echo as a function of frequency. Hence, the normalized full-band correlation is generalized in the spirit of the above formula to provide frequency resolution, and the frequency dependent normalized uplink correlation at the downlink pitch period is calculated as:

$$C_{N,UL}(k,L_{DL})=\frac{\sum_{k_{win}=k-K}^{k+K}|Y_{AEC,m}(k_{win})|^2\cdot\mathrm{Re}\left\{e^{\frac{j2\pi k_{win}L_{DL}}{N_{fft}}}\right\}}{\sum_{k_{win}=k-K}^{k+K}|Y_{AEC,m}(k_{win})|^2},\qquad \text{Equation 30}$$

-continued $$k=0,1,\ldots,\frac{N_{fft}}{2}$$

$$=\frac{\sum_{k_{win}=k-K}^{k+K}|Y_{AEC,m}(k_{win})|^2\cdot\cos\left(\frac{2\pi k_{win}L_{DL}}{N_{fft}}\right)}{\sum_{k_{win}=k-K}^{k+K}|Y_{AEC,m}(k_{win})|^2},$$

$$k=0,1,\ldots,\frac{N_{fft}}{2},$$

where K determines a window for averaging, e.g. 10. Equation 30 represents a rectangular window, but, in certain embodiments, any alternate suitable window can be used. The expression is simplified by only considering the lower half of the symmetric power spectrum. The imaginary contribution of the low and upper halves of the full sum cancels, and hence only the real part is summed when only the lower half is considered. It is noted that for K=0 the frequency dependent normalized correlation becomes trivial:

$$C_{N,UL}(k,L_{DL})=\cos\left(\frac{2\pi k_{win}L_{DL}}{N_{fft}}\right),\qquad \text{Equation 31}$$

and hence some averaging, K≠0, is necessary.

The averaging over a window is a tradeoff with frequency resolution of $C_{N,UL}$ (k, $L_{DL}$) (i.e., measure of correlation 319). A good compromise can be K=10 as mentioned above, but it can be considered to make K dependent on frequency, e.g., larger for higher frequencies and smaller for lower frequencies.

A generalized version of the previously described normalized uplink correlation at the downlink pitch period can be derived to exploit information contained in the autocorrelation function of the uplink signal, at multiples of the downlink pitch period. This measure can be expressed as:

$$C_{N,UL}(L_{DL})=\frac{\sum_{n=0}^{N_{fft}}g(n)C_{UL}(n)}{C_{UL}(0)},\qquad \text{Equation 32}$$

where g(n) can itself be expressed as the element-wise product of functions:

$$g(n)=w(n)d(n),\qquad \text{Equation 33}$$

Here, w(n) represents some smoothing window, which can be used to control the weighting of various downlink pitch period multiples. d(n) is a series of delta functions at pitch period multiples, as defined below:

$$d(n)=\Sigma_{m=1}^{M}=\delta(n-mL_{DL}),\qquad \text{Equation 34}$$

and M denotes the number of pitch multiples contained within the sampled autocorrelation function and is dependent on $L_{DL}$ and $N_{fft}$. Note that the generalized measure can be expressed in terms of a convolution of functions:

$$C_{N,UL}(L_{DL})=\frac{\left.\sum_{n=0}^{N_{fft}}g(n)C_{UL}(m-n)\right|_{m=0}}{C_{UL}(0)}\qquad \text{Equation 35}$$

-continued $$= \frac{g(m) * C_{UL}(m)|_{m=0}}{C_{UL}(0)},$$

Then, using the convolution theorem associated with the Fourier transform, the generalized measure can be expressed in the frequency domain as:

Equation 36

$$C_{N,UL}(L_{DL}) = \frac{\sum_{k=0}^{N_{fft}} |Y_{AEC,m}(k)|^2 G(k)}{\sum_{k=0}^{N_{fft}} |Y_{AEC,m}(k)|^2} = \frac{\sum_{k=0}^{N_{fft}} |Y_{AEC,m}(k)|^2 (W(k) * D(k))}{\sum_{k=0}^{N_{fft}} |Y_{AEC,m}(k)|^2},$$

where G(k), W(k), and D(k) are the Fourier transforms of g(n), w(n), and d(n), respectively. whereas W(k) depends on the unspecified windowing function w(n), D(k) can be explicitly expressed by applying the Fourier transform to d(n), as shown below:

Equation 37

$$D(k) = \sum_{n=0}^{N_{fft}} \sum_{m=1}^{M} \delta(n - mL_{DL}) e^{\frac{-j2\pi nk}{N_{fft}}} \approx -\frac{L_{DL}}{N_{fft}} + \sum_{l=0}^{K} \delta\left(k - l\frac{N_{fft}}{L_{DL}}\right),$$

where K denotes the number of fundamental frequency multiples contained within $N_{fft}$. The approximation in Equation 37 is a result of the fact that downlink pitch periods are generally not perfect factors of the FFT length. However, the expression serves as a relatively close approximation, particularly for large M, and the approximation is exact when the downlink pitch period is a factor of the FFT length.

From Equation 37, it can be observed that the generalized normalized uplink correlation at the downlink pitch period is obtained as the summed element-wise product of the uplink spectrum and a masking function. The masking function is constructed as the convolution of a series of deltas located at multiples of the fundamental frequency of the downlink signal, and a smoothing window which spreads the effect of the masking function beyond exact multiples of the fundamental frequency.

Figure 3H:
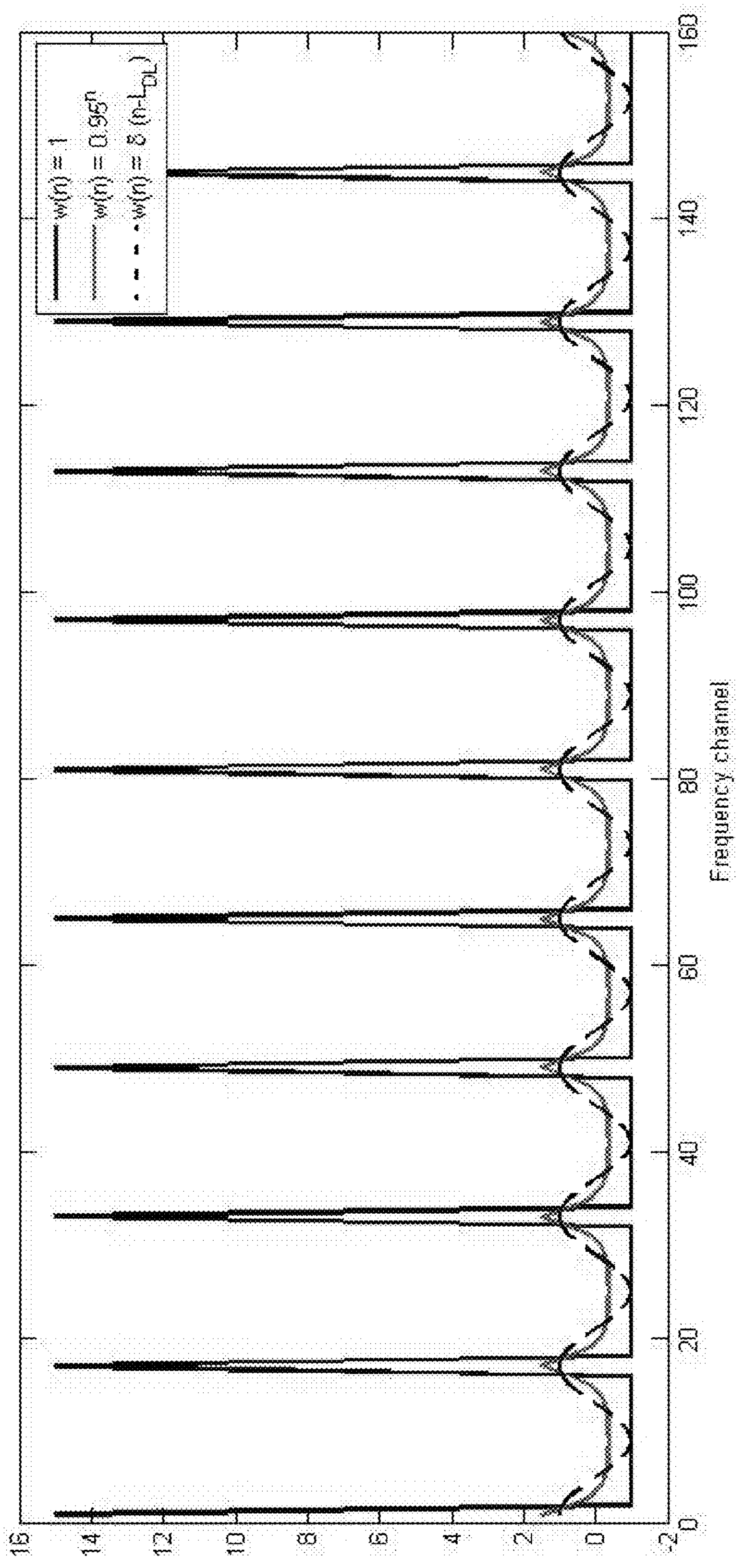
FIG. 3H depicts an example graph that plots example masking functions for different windowing functions, according to an example embodiment.

This relationship can be observed in FIG. 3H, where example masking functions are plotted for different windowing functions. As shown in FIG. 3H, masking functions are shown for three different windowing functions, w(n). As further shown in FIG. 3H, the downlink pitch period $L_{DL}$ is 10, and the FFT length $N_{FFT}$ is 160.

In accordance with an embodiment, UL correlation feature extraction component 322 may receive residual echo information 338 from the front end that includes measure of correlation 319 and UL correlation feature extraction component 322 extracts measure of correlation 319 from residual echo information 338. In accordance with another embodiment, residual echo information 338 may include the FDAEC output signal and the downlink signal (or the pitch period thereof), and UL correlation feature extraction component 322 determines the measure of correlation in the FDAEC output signal at the pitch period of the downlink signal as a function of frequency. The correlation at the downlink pitch period of the FDAEC output signal may be calculated as a normalized correlation of the FDAEC output signal at a lag corresponding to the downlink pitch period, providing a measure of correlation that is bounded between 0 and 1. In accordance with either embodiment, UL correlation feature extraction component 322 provides measure of correlation 319 to spatial feature statistical modeling component 314.

In an embodiment where back-end SCS component 300 comprises an implementation of SCS component 116, residual echo information 338 corresponds to residual echo information 238.

Spatial feature statistical modeling component 314 may be configured to determine and provide a probability 321 that a particular frame is from a non-desired source (e.g., residual echo) on a per-frame basis and/or per-frequency bin basis based on measure of correlation 319. For example, the GMM being modelled by spatial feature statistical modeling component 314 may also include a mixture that corresponds to residual echo. The mixture may be adapted based on measure of correlation 319. Probability 321 may be relatively higher if measure of correlation 319 indicates that the FDAEC output signal has high correlation at the pitch period of the downlink signal, and probability 321 may be relatively lower if measure of correlation 319 indicates that the FDAEC output signal has low correlation at the pitch period of the downlink signal. Probability 321 is provided to SRER estimation component 326.

SRER estimation component 326 may be configured to determine an SRER estimate 323 based on probability 321 and 313 on a per-frame basis and/or per-frequency bin basis. In accordance with an embodiment, SRER estimate 323 may be determined in accordance to Equation 26 provided above, where $x_{IS}$ corresponds to non-stationary noise or residual echo included in x, $P(y|H_{DS})$ corresponds to probability 313 (i.e., the likelihood of feature y given the desired source hypothesis) and $P(y|H_{IS})$ corresponds to probability 321 (i.e., the likelihood of feature y given the non-stationary noise or residual echo hypothesis). SRER estimate 323 is provided to multi-noise source gain component 332. As will be described below, SRER estimate 323 may be used to determine optimal gain 325, which is used to suppress residual echo (and/or other types of interfering sources) present in first signal 340.

The two measures, SRER estimate (based on downlink and traditional ERL and ERLE estimates, and not on measure of correlation 319 as described above) and measure of correlation 319, are complimentary. Thus, in accordance with an embodiment, it may be advantageous to use a multi-variate GMM with a feature vector including both measures. While measure of correlation 319 will capture non-linear residual echo well, SRER estimate (based on downlink and traditional ERL and ERLE estimates, and not on measure of correlation 319 as described above) will capture linear residual echo. Additionally, as also described above, the modeling can be carried out on a frequency basis in order to exploit frequency separation between desired source and residual echo.

In accordance with an embodiment in a multi-microphone system, where the loudspeaker in speakerphone mode is in near proximity to one microphone, a power or magnitude spectrum ratio feature is formed between a microphone far from the loudspeaker and the microphone close to the loudspeaker. This naturally occurs on a cellular handset in speakerphone phone mode where the loudspeaker is at the bottom of the phone, one microphone is at the bottom of the phone, and a second microphone is at the top of the phone. The ratio can be formed down-stream of acoustic echo cancellation so that only the presence of residual echo is captured by the feature. This can be combined and modelled jointly with the Anc2AmbR (i.e., ratio 309) because the output of ABM 216 (i.e., second signal 334) originates from the microphone relatively close to the loudspeaker less desired source, and the output of ANC 220 (i.e., first signal 340) originates from the microphone relatively far from the loudspeaker less spatial interfering sources.

In accordance with an embodiment, forming the power or magnitude spectrum ratio is done by using an additional mixture in the GMM modeling. In accordance with such an embodiment, the desired source will generally have a relatively high Anc2AbmR, acoustic environmental noise will generally have relatively lower Anc2AbmR, and residual echo will have a much lower Anc2AbmR compared to the acoustic environment noise. It may be suitable to use three mixtures in each frequency band/bin: one for desired source, one for non-stationary/spatial noise, one for residual echo. It is noted that if each microphone path has acoustic echo cancellation (AEC) prior to the spatial front-end with ANC 220 and ABM 214, then this particular modeling would indeed capture residual echo (assuming AEC provides similar ERLE on the two microphone paths).

4. Multi-Noise Source Gain Rule

Multi-noise source gain component 332 may be configured to determine an optimal gain 325 that is used to suppress multiple types of interfering sources (e.g., stationary noise, non-stationary noise, residual echo, etc.) present in first signal 340 on a per-frame basis and/or per-frequency bin basis. An observed signal (e.g., first signal 340) that includes multiple types of interfering sources may be represented in accordance with Equation 38:

$$Y=X+\Sigma_{k=1}^{K}N_k, \qquad \text{Equation 38}$$

where Y corresponds to the observed signal (e.g., first signal 340), X corresponds to the underlying clean speech in observed signal Y and $N_k$ corresponds to the kth interfering source (e.g., stationary noise, non-stationary noise, or residual echo). For simplicity, a value of 1 for k corresponds to stationary noise, a value of 2 for k corresponds to non-stationary noise and a value of 3 for k corresponds to residual echo.

A global cost function may be formulated that minimizes the distortion of the desired source and that also achieves satisfactory noise suppression. Such a global cost function may be a composite of more than one branch cost function. For example, the global cost function may be based on a cost function for minimizing the distortion of the desired source and a respective branch cost function for minimizing the distortion of each of the k interfering sources (i.e., the unnaturalness of the residual of an interfering source, as it is referred to in the aforementioned U.S. patent application Ser. No. 12/897,548, the entirety of which has been incorporated by reference as if fully set forth herein). These different cost functions may be further weighted to obtain a degree of balance between distortion of the desired source and the distortion of the k interfering sources. A global cost function is shown in Equation 39:

$$C=\Sigma_{k=1}^{K}\lambda_k[\alpha_k E\{(1-G)^2X^2\}+(1-\alpha_k)E\{(H_k-G)^2N_k^2\}], \qquad \text{Equation 39}$$

where $E\{(1-G)^2X^2\}$ corresponds to the cost function for minimizing the distortion of the desired source included in observed signal Y, $E\{(H_k-G)^2N_k^2\}$ corresponds to the branch cost function for minimizing the distortion of the residual of the kth interfering source included in observed signal Y, G corresponds to the optimal gain (i.e., gain that optimizes (or minimizes) the corresponding cost function, $H_k$ corresponds to an amount of desired attenuation to be applied to the kth interfering source included in observed signal Y, $\alpha_k$ corresponds to an intra-branch tradeoff that specifies a degree of balance between distortion of the desired source included in observed signal Y and distortion of the residual kth interfering source included in the noise-suppressed signal (e.g., noise-suppressed signal 344), where $0\le\alpha_k\le 1$, and $\lambda_k$ corresponds to an inter-branch tradeoff that weights each of the k composite cost functions.

Once the global cost function is formulated, the optimal gain, G, may be determined by taking the derivative of the global cost function with respect to the optimal gain and setting the derivative to zero. This is shown in Equation 40:

$$\partial C/\partial G=-2\Sigma_k\{\lambda_k\alpha_k(1-G)\sigma_x^2+\lambda_k(1-\alpha_k)(H_k-G)\sigma_{N_k}^2\}=0, \qquad \text{Equation 40}$$

As shown in Equation 40, the second moment (i.e., variance) for each of the k interfering noise sources (i.e., $\sigma_{N_k}^2$) and the desired source (i.e., $\sigma_{N_k}^2$) that naturally occur from the expectations used in Equation 39 are introduced. The second moment of the desired source divided by the second moment of a particular kth interfering noise source is equivalent to the SNR for that particular kth interfering noise source. This is shown in Equation 41:

$$\xi_k \triangleq \frac{\sigma_x^2}{\sigma_{N_k}^2}, \qquad \text{Equation 41}$$

where $\xi_k$ corresponds to the SNR for the kth interfering noise source.

Optimal gain, G, may be determined by simplifying Equation 41 to Equation 42, as shown below:

$$G\left[\sum_k\{\lambda_k\alpha_k+\lambda_k(1-\alpha_k)\xi_k^{-1}\}\right]=\left[\sum_k\{\lambda_k\alpha_k+\lambda_k(1-\alpha_k)H_k\xi_k^{-1}\}\right] \qquad \text{Equation 42}$$

$$G=\left[\frac{\sum_k\{\lambda_k\alpha_k+\lambda_k(1-\alpha_k)H_k\xi_k^{-1}\}}{\sum_k\{\lambda_k\alpha_k+\lambda_k(1-\alpha_k)\xi_k^{-1}\}}\right],$$

In the case where there is only one interfering noise source (i.e., k=1), the existing solution is simplified to Equation 43, as shown below:

$$G=\left[\frac{\alpha\xi+(1-\alpha)H}{\alpha\xi+(1-\alpha)}\right], \qquad \text{Equation 43}$$

Equation 43 represents the gain rule derived in aforementioned U.S. patent application Ser. No. 12/897,548, the entirety of which has been incorporated by reference as if fully set forth herein. Hence, the generalized multi-source gain rule degenerates to the gain rule derived in aforementioned U.S. patent application Ser. No. 12/897,548 in the case of a single interfering source.

Multi-noise source gain component 332 may be configured to determine optimal gain 325, which is used to suppress multiple types of interfering sources from input signal 340, in accordance with Equation 42. For example, as described above, SSNR estimation component 306 may provide SSNR estimate 303, SNSNR estimation component 316 may provide SNSNR estimate 317 and SRER estimation component 326 may provide SRER estimate 323. Each of these estimates may correspond to an SNR (i.e., $\xi$) for a kth interfering noise source. In addition, each of these estimates may be provided on a per-frame basis and/or per-frequency bin basis.

In accordance with an embodiment, the value of the target suppression parameter H for each of the k interfering noise sources comprises a fixed aspect of back-end SCS component 300 that is determined during a design or tuning phase associated with that component. Alternatively, the value of the target suppression parameter H for each of the k interfering noise sources may be determined in response to some form of user input (e.g., responsive to user control of settings of a device that includes back-end SCS component 300). In a still further embodiment, the value of the target suppression parameter H for each of the k interfering noise sources may be adaptively determined based at least in part on characteristics of first signal 340. In accordance with any of these embodiments, the values for each of the target suppression parameter(s) $H_k$ may be constant across all frequencies, or alternatively, the values of first target suppression parameter(s) $H_k$ may very per frequency bin.

The value for each intra-branch tradeoff $\alpha$ for a particular k interfering noise source may be based on a probability that a particular frame of first signal 340 is from a desired source (e.g., speech) with respect to the particular interfering noise. For example, the intra-branch tradeoff associated with the stationary noise branch (e.g., $\alpha_1$) may be based on probability 307, the intra-branch tradeoff associated with the non-stationary noise branch (e.g., $\alpha_2$) may be based on probability 313 and the intra-branch tradeoff associated with the residual echo branch (e.g., $\alpha_3$) may be based on probability 321.

In one embodiment, the value of the intra-branch tradeoff parameter $\alpha$ associated with each of the k interfering noise sources comprises a fixed aspect of back-end SCS component 300 that is determined during a design or tuning phase associated with that component. Alternatively, the value of the intra-branch tradeoff parameter $\alpha$ associated with each of the k interfering noise sources may be determined in response to some form of user input (e.g., responsive to user control of settings of a device that includes back-end SCS component 300).

In a still further embodiment, the value of the intra-branch tradeoff parameter $\alpha$ associated with each of the k interfering noise sources is adaptively determined. For example, the value of $\alpha$ associated with a particular kth interfering noise source may be adaptively determined based at least in part on the probability that a particular frame and/or frequency bin of first signal 340 is from a desired source with respect to the particular kth interfering noise source. For instance, if the probability that a particular frame and/or frequency bin of first signal 340 is a desired source with respect to a particular kth interfering noise source is high, the value of $\alpha_k$ may be set such that an increased emphasis is placed on minimizing the distortion of the desired source. If the probability that a particular frame and/or frequency bin of first signal 340 is from a desired source with respect to the particular kth interfering noise source is low, the value of $\alpha_k$ may be set such that an increased emphasis is placed on minimizing the distortion of the residual kth interfering noise source.

In accordance with such an embodiment, each intra-branch tradeoff, $\alpha$, may be determined in accordance with Equation 44, which is shown below:

$$\alpha=\alpha_N+P_{DS}\alpha_S, \qquad \text{Equation 44}$$

where $\alpha_N$ corresponds to a tradeoff intended for a particular interfering noise source included in first signal 340, $\alpha_S+\alpha_N$ corresponds to a tradeoff intended for a desired source included in first signal 340, and $P_{DS}$ corresponds to a probability that a particular frame and/or frequency bin of first signal 340 is from a desired source with respect to a particular interfering noise source (e.g., probability 307, probability 313, or probability 313).

In addition to, or in lieu of, adaptively determining the value of intra-branch tradeoff $\alpha$ based on a probability that a particular frame and/or frequency bin of first signal 340 is from a desired source with respect to a particular interfering noise source, the value of $\alpha$ may be adaptively determined based on modulation information associated with first signal 340. For example, as shown in FIG. 3C, fullband modulation feature extraction component 328 may extract features 327 of an energy contour associated with first signal 340 over time. Features 327 are provided to fullband modulation statistical modeling component 330.

Fullband modulation statistical modeling component 330 may be configured to model features 327 on a per-frame basis and/or per-frequency bin basis. In accordance with an embodiment, modulation statistical modeling component 330 models features 327 using GMM modeling. By using GMM modeling, a probability 329 that a particular frame and/or frequency bin of first signal 340 is from a desired source (e.g., speech) may be determined. For example, it has been observed that an energy contour associated with a signal that changes relatively fast over time equates to the signal including a desired source; whereas an energy contour associated with a signal that changes relatively slow over time equates to the signal including an interfering source. Accordingly, in response to determining that the rate at which the energy contour associated with first signal 340 changes is relatively fast, probability 329 may be relatively high, thereby causing the value of $\alpha_k$ to be set such that an increased emphasis is placed on minimizing the distortion of the desired source during frames including the desired source. In response to determining that the rate at which the energy contour associated with first signal 340 changes is relatively slow, probability 329 may be relatively low, thereby causing the value of $\alpha_k$ to be set such that an increased emphasis is placed on minimizing the distortion of the residual kth interfering noise signal. Still other adaptive schemes for setting the value of $\alpha_k$ may be used.

The value of inter-branch tradeoff parameter, $\lambda$, for each of the k interfering noise sources may be based on measure of spatial ambiguity 331. For example, if measure of spatial ambiguity 331 is indicative of spatial feature statistical modeling component 314 being in a spatially ambiguous state, then the value of $\lambda$ associated with the non-stationary branch (e.g. $\lambda_2$) is set to a relatively low value, and the value of $\lambda$ associated with the stationary noise branch and the residual echo branch (e.g., $\lambda$ and $\lambda_3$) are set to relatively higher values. By doing so, the non-stationary noise branch is effectively disabled (i.e. soft-disabled). The non-stationary noise branch may be re-enabled (i.e., soft-enabled) in the event that measure of spatial ambiguity 331 is indicative of spatial feature statistical modeling component 314 being in a spatially confident state by increasing the value of $\lambda_2$ and adjusting the values of $\lambda$ and $\lambda_3$ (such that the sum of all the inter-branch tradeoff parameters is equal to one) accordingly.

In accordance with an embodiment where multi-noise source gain component 332 is configured to determine optimal gain 325 on a per-frequency bin basis, multi-noise source gain component 332 provides a respective optimal gain value for each frequency bin.

Gain application component 346 may be configured to suppress noise (e.g., stationary noise, non-stationary noise and/or residual echo) present in first signal 340 by applying optimal gain 325 to provide noise-suppressed signal 344. In accordance with an embodiment, gain application component 346 is configured to suppress noise present in first signal 340 on a frequency bin by frequency bin basis using the respective optimal gain values obtained for each frequency bin, as described above.

It is noted that in accordance with an embodiment, back-end SCS component 300 is configured to operate in a single-user speakerphone mode of a device in which SCS component 300 is implemented or a conference speakerphone mode of such a device. In accordance with such an embodiment, back-end SCS component 300 receives a mode enable signal 336 from a mode detector (e.g., activity mode detector 222, as shown in FIG. 2) that causes back-end SCS component 300 to switch between single-user speakerphone mode or conference speakerphone mode. Accordingly, mode enable signal 336 may correspond to mode enable signal 236, as shown in FIG. 2. When operating in conference speakerphone mode, mode enable signal 336 may cause the non-stationary branch to be disabled (e.g., $\lambda_2$ is set to a relatively low value, for example, zero). Accordingly, gain application component 346 may be configured to suppress stationary noise and/or residual echo present in first signal 340 (and not non-stationary noise). When operating in single-user speakerphone mode, mode enable signal 336 may cause the non-stationary noise suppression branch to be enabled. Accordingly, gain application component 346 may be configured to suppress stationary noise, non-stationary noise, and/or residual echo present in first signal 340.

Figure 3I:
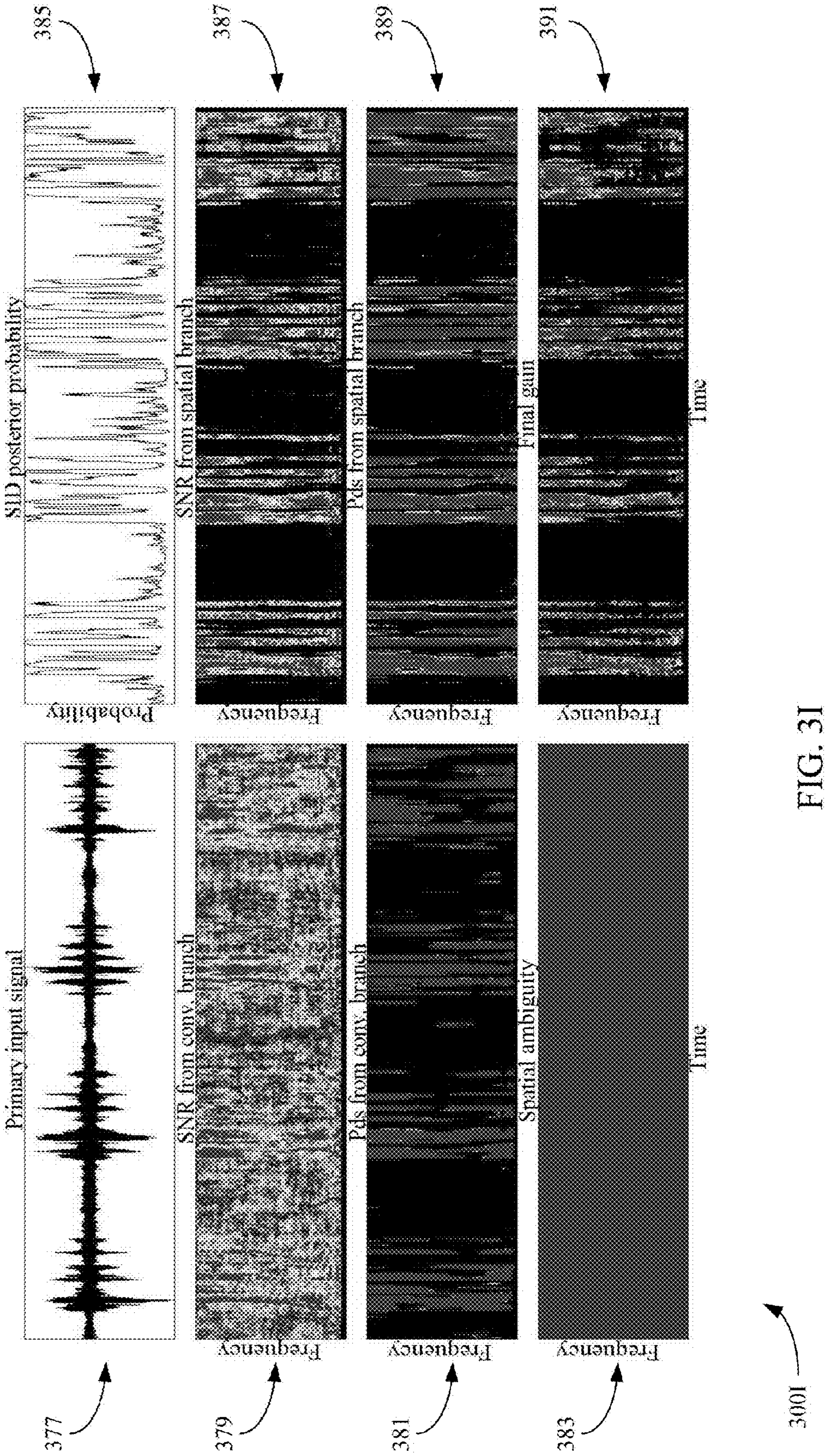
FIG. 3I depicts example diagnostic plots associated with an input signal that includes speech and babble noise, according to an example embodiment.

FIG. 3I shows example diagnostic plots of a segment of an input signal (e.g., first signal 340) that includes speech (i.e., a desired source) and babble noise (i.e., an interfering source) in accordance to back-end SCS system 300. Plot 377 shows first signal 340 as received from a primary microphone (i.e., microphone $\mathbf{106}_1$, as shown in FIG. 1). Plot 379 shows the SSNR estimate (i.e., SSNR estimate 303) and panel 381 shows the probability of desired source (i.e., probability 307) inferred from statistical modeling of the SNR features by SSNR feature statistical modeling component 310. Plot 383 shows the estimated spatial ambiguity (e.g., measure of spatial ambiguity 331 obtained by spatial feature statistical modeling component 314), which is constant at unity due to the spatial diversity present in this segment. Plot 385 shows the posterior probability of target speaker (i.e., classification 311 provided by SID feature extraction component 318). Plot 387 shows the SNSNR estimate (i.e., SNSNR estimate 317) and plot 389 shows the probability of desired source (i.e., probability 313) inferred from statistical modeling of the Anc2AbmR feature (i.e., ratio 309) by spatial feature statistical modeling component 314. Plot 391 illustrates the final gain (i.e., optimal gain 325) obtained by the multi-noise source gain component 332.

Figure 3J:
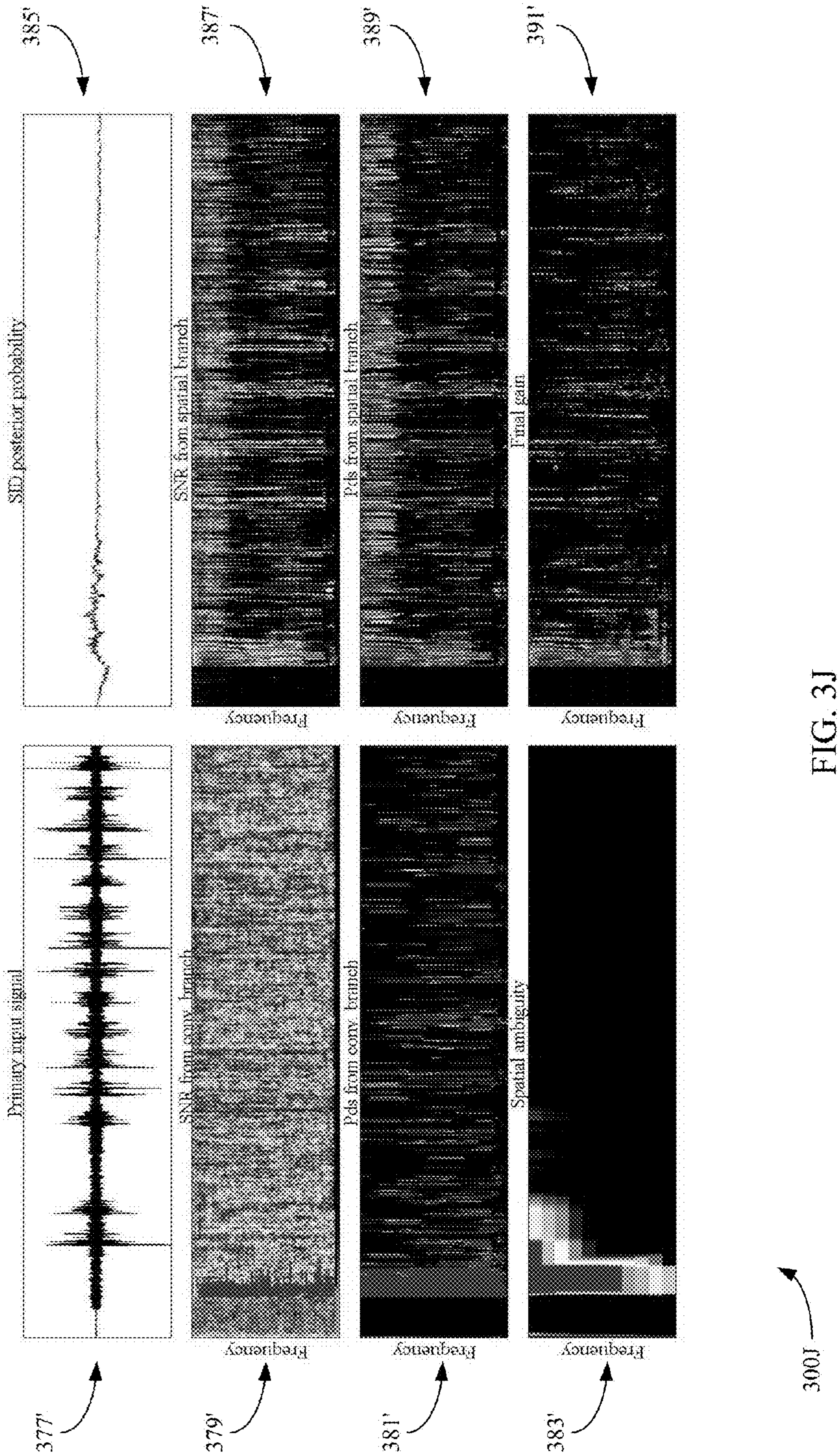
FIG. 3J depicts example diagnostic plots associated with an input signal that includes speech and babble noise, according to another example embodiment.

FIG. 3J shows an analogous plot for a segment of an input speech (e.g., first signal 340) that includes speech and babble noise, but captured in a spatially ambiguous configuration. Note that the spatial ambiguity measure (i.e., measure of spatial ambiguity 331) shown in plot 383' converges to zero (indicating spatial ambiguity), and the final gain shown in panel 391' follows the SSNR estimate and probability of desired source inferred from statistical modeling of the SNR feature shown in panels 379' and 381', respectively.

Figure 4:
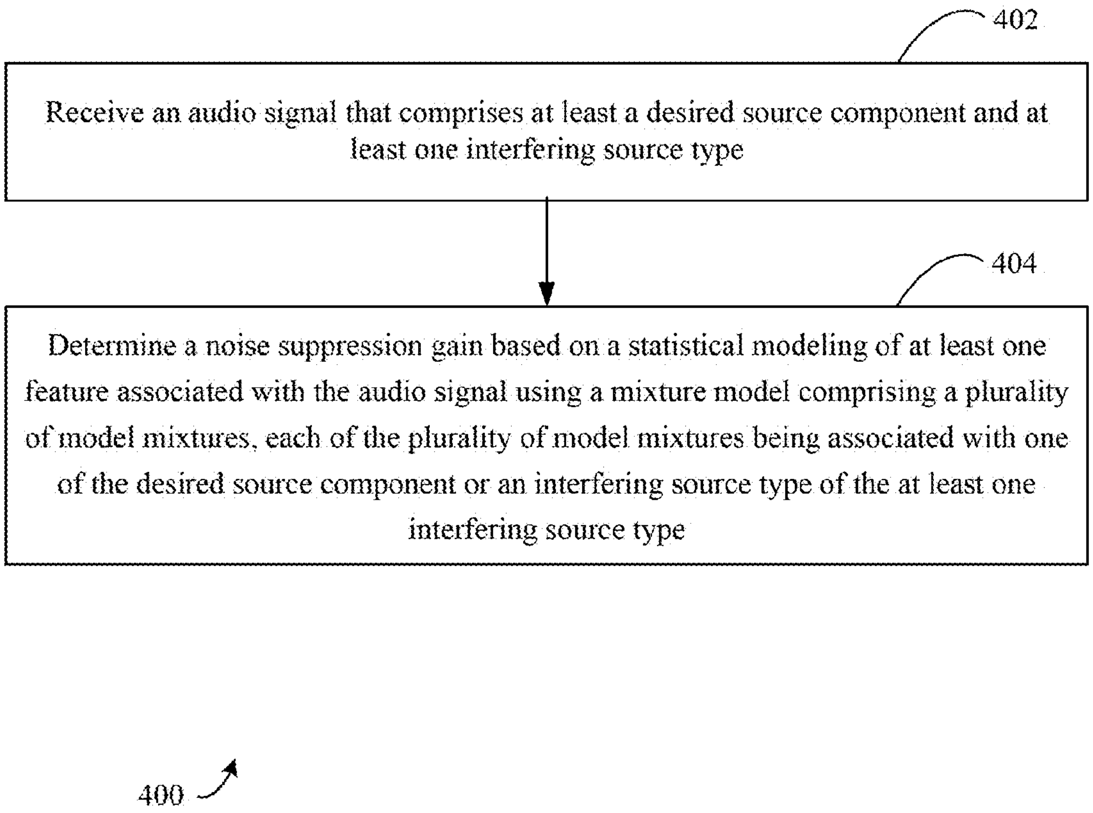
FIG. 4 depicts a flowchart of a method for determining a noise suppression gain, according to an example embodiment.

Accordingly, in embodiments, system 300 may operate in various ways to determine a noise suppression gain used to suppress multiple types of interfering sources present in an audio signal. For example, FIG. 4 depicts a flowchart 400 of an example method for determining a noise suppression gain in accordance with an example embodiment. The method of flowchart 400 will now be described with continued reference to system 300 of FIG. 3C, although the method is not limited to that implementation. Other structural and operational embodiments will be apparent to persons skilled in the relevant art(s) based on the discussion regarding flowchart 400 and system 300.

As shown in FIG. 4, the method of flowchart 400 begins at step 402, where an audio signal is received that comprises at least a desired source component and at least one interfering source type. For example, with reference to FIG. 3C, back-end SCS component receives first signal 340.

In accordance with an embodiment, the one or more interfering source types include stationary noise and non-stationary noise.

At step 404, a noise suppression gain is determined based on a statistical modeling of at least one feature associated with the audio using a mixture model comprising a plurality of model mixtures, each of the plurality of model mixtures being associated with one of the desired source component or an interfering source type of the at least one interfering source type.

For example, with reference to FIG. 3C, multi-noise source gain component 332 determines a noise suppression gain (i.e., optimal gain 325). SSNR feature statistical modeling component 310 and/or spatial feature statistical modeling component 314 may statistically model at least one feature associated with the audio signal using a mixture model (e.g., a Gaussian mixture model) that comprises a plurality of model mixtures. SSNR feature statistical modeling component 310 and/or spatial feature statistical modeling component 314 may associate each of the plurality of model mixtures with one of the desired source component or an interfering source type of the at least one interfering source type.

In accordance with an embodiment, the statistical modeling is adaptive based on at least one feature associated with each frame of the audio signal being received.

In accordance with an embodiment, the determination of the noise suppression gain includes determining one or more contributions that are derived from the at least one feature and determining the noise suppression gain based on the one or more contributions. Each of the one or more contributions may be determined in accordance to the composite cost function described above with reference to Equation 39 (i.e., each of the one or more contributions may be based on a branch cost function for minimizing the distortion of the residual of a respective kth interfering source included in the audio signal plus the cost function for minimizing the distortion of the desired source component included in the audio signal).

In accordance with an embodiment, the one or more contributions are weighted based on a measure of ambiguity between two or more of the plurality of model mixtures. For example, with reference to FIG. 3C, the one or more contributions may be weighted based on measure of spatial ambiguity 331.

In accordance with an embodiment, a respective model mixture of the plurality of model mixtures is associated with one of the desired source component or an interfering source type of the at least one interfering source type based on one or more properties (e.g., the mean, variance, etc.) of the respective model mixture and one or more expected characteristics (e.g., the SNR, Anc2AbmR, etc.) of a respective interfering source type of the at least one interfering source type.

In accordance with an embodiment, the noise suppression gain is determined for each of a plurality of frequency bins of the audio signal. For example, with reference to FIG. 3C, optimal gain 325 is determined for each of a plurality of frequency bins of first signal 340.

Figure 5:
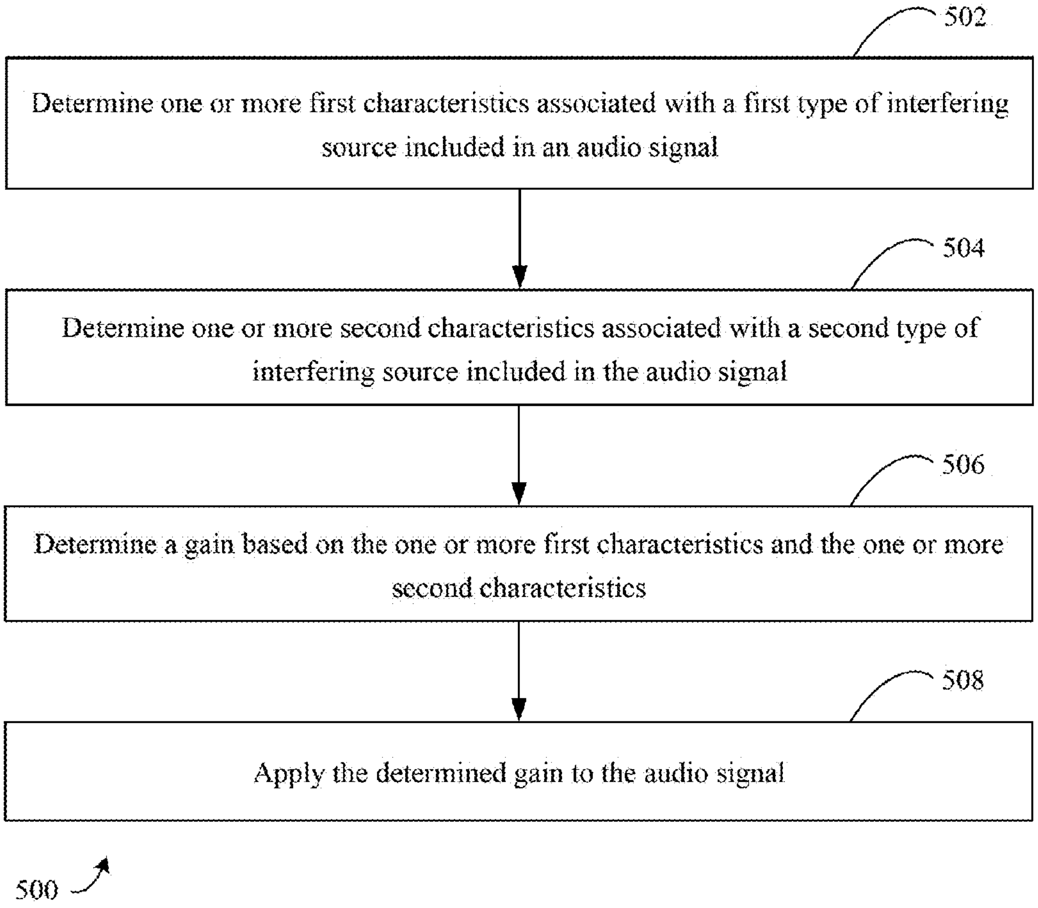
FIG. 5 depicts a flowchart of a method for applying a determined gain to an audio signal, according to an example embodiment.

FIG. 5 depicts a flowchart 500 of an example method for determining and applying a gain to an audio signal in accordance with an example embodiment. The method of flowchart 500 will now be described with continued reference to system 300 of FIG. 3C, although the method is not limited to that implementation. Other structural and operational embodiments will be apparent to persons skilled in the relevant art(s) based on the discussion regarding flowchart 500 and system 300.

As shown in FIG. 5, the method of flowchart 500 begins at step 502, where one or more first characteristics associated with a first type of interfering source in an audio signal are determined. In accordance with an embodiment, the first type of interfering source is stationary noise. In accordance with such an embodiment, the first characteristic(s) include an SNR regarding the stationary noise with respect to the audio signal and a first measure of probability indicative of a probability that the audio signal is from a desired source with respect to the stationary noise.

For example, with reference to FIG. 3C, multi-noise source gain component 332 receives first characteristic(s) associated with stationary noise included in first signal 340. For instance, the first characteristic(s) may include SSNR estimate 303 and probability 307 that indicates a probability that a particular frame of first signal 340 is from a desired source with respect to the stationary noise.

At step 504, one or more second characteristics associated with a second type of interfering source in an audio signal are determined. In accordance with an embodiment, the second type of interfering source is non-stationary noise. In accordance with such an embodiment, the second characteristic(s) include an SNR regarding the non-stationary noise with respect to the audio signal and a second measure of probability indicative of a probability that the audio signal is from a desired source with respect to the non-stationary noise.

For example, with reference to FIG. 3C, multi-noise source gain component 332 receives the second characteristic(s) associated with non-stationary noise included in first signal 340. For instance, the second characteristic(s) may include SNSNR estimate 317 and probability 313 that indicates a probability that a particular frame of first signal 340 is from a desired source with respect to the non-stationary noise.

At step 506, a gain based on the first characteristic(s) and the second characteristic(s) is determined. For example, with reference to FIG. 3C, multi-noise source gain component 332 determines optimal gain 325 based on the first characteristic(s) and the second characteristic(s). In accordance with an embodiment, multi-source gain component determines optimal gain 325 in accordance with Equation 42 described above. In accordance with another embodiment, a gain (i.e., optimal gain 325) is determined for each of a plurality of frequency bins of the audio signal (i.e., first signal 340) based on the first characteristic(s) and the second characteristic(s).

At step 508, the determined gain is applied to the audio signal. For example, with reference to FIG. 3C, gain application component 346 applies optimal gain 325 to first signal 340. In accordance with an embodiment in which a gain is determined for each of a plurality of frequency bins of the audio signal, each of the determined gains are applied to a corresponding frequency bin of the audio signal.

In accordance with an embodiment, the determined gain is applied in a manner that is controlled by a tradeoff parameter $\alpha$ ssociated with a measure of spatial ambiguity.

For example, with reference to FIG. 3C, multi-noise source gain component 332 may set the value of the inter-branch tradeoff parameter(s) (i.e., $\lambda_k$) based on measure of spatial ambiguity 331.

In accordance with another embodiment, the determined gain is applied in a manner that is controlled by a first parameter that specifies a degree of balance between a distortion of a desired source included in the audio signal and a distortion of a residual amount of the first type of interfering source included in a noise-suppressed signal that is obtained from applying the determined gain to the audio signal and a second parameter that specifies a degree of balance between the distortion of the desired source included in the audio signal and a distortion of a residual amount of the second type of interfering source included in the noise-suppressed signal, For example, with reference to FIG. 3C, multi-noise source gain component 332 may determine the value of the first parameter (i.e., $\alpha_1$) that specifies a degree of balance between the distortion of the desired source included in first signal 340 and the distortion of a residual amount of the first type of interfering source included in noise-suppressed signal 344 and may also determine the value of the second parameter (i.e., $\alpha_2$) that specifies a degree of balance between the distortion of the desired source included in first signal 340 and the distortion of a residual amount of the second type of interfering included in noise-suppressed signal 344.

In accordance with an embodiment, the value of the first parameter is set based on the probability that the audio signal is from a desired source with respect to the first type of interfering source, and the value of the second parameter is set based on the probability that the audio signal includes a desired source with respect to the second type of interfering source included in the audio signal.

For example with reference to FIG. 3C, the value of the first parameter may be set based on probability 307 that indicates a probability that a particular frame of first signal 340 is from a desired source with respect to the first type of interfering source (e.g., stationary noise) included in first signal 340, and the value of the second parameter may be set based on probability 313 that indicates a probability that a particular frame of first signal 340 is from a desired source with respect to the second type of interfering source (e.g., non-stationary noise) included in first signal 340.

In accordance with another embodiment, the value of the first parameter and the value of the second parameter α re based, at least in part, on a rate at which an energy contour associated with the audio signal changes. FIG. 6 depicts a flowchart 600 of an example method for setting a value of α first parameter α nd a second parameter based on a rate at which an energy contour associated with an audio signal changes in accordance with an embodiment. The method of flowchart 600 will now be described with continued reference to system 300 of FIG. 3C, although the method is not limited to that implementation. Other structural and operational embodiments will be apparent to persons skilled in the relevant art(s) based on the discussion regarding flowchart 600 and system 300.

As shown in FIG. 6, the method of flowchart 600 begins at step 602, where a rate at which an energy contour associated with the audio signal changes is determined. For example, with reference to FIG. 3C, fullband modulation statistical modeling component 330 may determine the rate at which the energy contour associated with first signal 340 changes. Fullband modulation statistical modeling component 330 provides probability 329 that indicates a probability that a particular frame of first signal 340 is a desired source (e.g., speech) based on the determination. For example, it has been observed that an energy contour associated with a signal that changes relatively fast over time equates to the signal including a desired source; whereas an energy contour associated with a signal that changes relatively slow over time equates to the signal including an interfering source. Accordingly, in response to determining that the rate at which the energy contour associated with first signal 340 changes is relatively fast, probability 329 may be relatively high. In response to determining that the rate at which the energy contour associated with first signal 340 changes is relatively slow, probability 329 may be relatively low.

At step 604, the value of the first parameter and the value of the second parameter are set such that an increased emphasis is placed on minimizing the distortion of the desired source included in the audio signal in response to determining that the rate at which the energy contour changes is relatively fast. For example, with reference to FIG. 3C, multi-noise source gain component 332 may set the value of the first parameter (i.e., $\alpha_1$) and the second parameter (i.e., $\alpha_2$) such that an increased emphasis is placed on minimizing the distortion of the desired source included in the first signal 340 if probability 329 is relatively high.

At step 606, the value of the first parameter is set such that an increased emphasis is placed on minimizing the distortion of the residual amount of the first type of interfering source included in the noise-suppressed signal, and the value of the second parameter is set such that an increased emphasis is placed on minimizing the distortion of the residual amount of the second type of interfering source included in the noise-suppressed signal in response to determining that the rate at which the energy contour changes is relatively slow. For example, with reference to FIG. 3C, multi-noise source gain component 332 may set the value of the first parameter (i.e., $\alpha_1$) such that an increased emphasis is placed on minimizing the distortion of the residual amount of the first type of interfering source (e.g., stationary noise) included in noise-suppressed signal 344 and may set the value of the second parameter (i.e., $\alpha_2$) such that an increased emphasis is placed on minimizing the distortion of the residual amount of the second type of interfering source (e.g., non-stationary noise) included in noise-suppressed signal 344 if probability 329 is relatively low.

V. Other Back-End Single-Channel Suppression Embodiments

While FIG. 3C depicts a system for suppressing stationary noise, non-stationary noise, and residual echo from an observed audio signal (e.g., first signal 340), it is noted that the foregoing embodiments may also be used to suppress multiple types of non-stationary noise (e.g., wind noise, traffic noise, etc.) and/or other types of interfering sources (e.g., reverberation). For example, FIG. 7 is a block diagram of a back-end SCS component 700 that is configured to suppress multiple types of non-stationary noise and/or other types of interfering sources in accordance with an embodiment. Back-end SCS component 700 may be an example of back-end SCS component 116 or back-end SCS component 300. As shown in FIG. 7, FIG. 7 includes stationary noise estimation component 304, SSNR estimation component 306, SSNR feature extraction component 308, SSNR feature statistical modeling component 310, spatial feature extraction component 712, spatial feature statistical modeling component 714, SNSNR estimation component 716, multi-noise source gain component 332 and gain application component 346.

Stationary noise estimation component 304, SSNR estimation component 306, SSNR feature extraction component 308 and SSNR feature statistical modeling component 310 operate in a similar manner as described above with reference to FIG. 3C to obtain SSNR estimate 303 and probability 307, respectively, which are used by multi-noise source gain component 332 to obtain an optimal gain 325.

Spatial feature extraction component 712 operates in a similar manner as spatial feature extraction component 312 as described above with reference to FIG. 3C to extract features from first signal 340 and second signal 334. However, spatial feature extraction component 712 is further configured to extract features $\mathbf{709}_{1\text{-}k}$, associated with multiple types of non-stationary noise and/or other interfering sources. For example, features $\mathbf{709}_1$ may correspond to features associated with a first type of non-stationary noise or other type of interfering source, features $\mathbf{709}_2$ may correspond to features associated with a second type of non-stationary noise or other type of interfering source, and features $\mathbf{709}_k$ may correspond to features associated with a kth type of non-stationary noise or other type of interfering source.

As described above, reverberation and wind noise are examples of additional types of non-stationary noise and/or other types of interfering sources that may be suppressed from an observed audio signal. An example of extracting features associated with reverberation and wind noise is described below.

Reverberation can be considered an additive noise, where all multi-path receptions of the desired source less the direct-path are considered interfering sources. The direct-path reception of the desired source by the microphone(s) (e.g., microphones $\mathbf{106}_{1\text{-}N}$, as shown in FIG. 1) are considered the ultimate desired source. The multi-path receptions of the desired source are generally filtered versions of the desired source that includes a delay and attenuation compared to the direct-path due to the longer distance the reflected sound wave travels and the sound absorption of the material of the reflecting surfaces. Hence, reverberation will manifest itself as a smearing or added tail to the direct-path desired source, and it will effectively reduce the modulation bandwidth compared to the source due to somewhat filling in the gaps of the time evolution of the magnitude spectrum between syllables (due to the smearing), see, for example, "The Linear Prediction Inverse Modulation Transfer Function (LP-IMTF) Filter for Spectral Enhancement, with Applications to Speaker Recognition" by Bengt J. Borgstrom and Alan McCree, ICASSP 2012, pp. 4065-4068, which is incorporated by reference herein.

However, instead of bandpass filtering the magnitude spectrum in time to suppress the reverberation, as described by Borgstrom and McCree, the modulation information pertinent to reverberation may be modelled (e.g., as a function of frequency). In accordance with an embodiment, the modulation information is modelled by lowpass filtering the magnitude spectrum in order to estimate the reverberation magnitude spectrum and using this estimate to calculate the SRR, which can be modelled (e.g., by spatial feature statistical modeling component 714, as described below) in a way similar to SNR feature vector 305. The statistical modeling of the SRR can then provide a probability of desired source, $P_{DS,m}(k)$, and a probability of interfering source, $P_{IS,m}(k)$, with respect to reverberation. It should be noted that the SRR feature will not only capture reverberation, but also stationary noise in general, and hence there is an overlap with the modeling of SNR feature vector 305, similar to how there is an overlap between the modeling of the Anc2AbmR feature (i.e., ratio 309) and SNR feature vector 305. This overlap can be mitigated by applying a conventional stationary noise suppression (of a suitable degree) to first signal 340 prior to estimating the SRR feature, similar to how a preliminary stationary noise suppression is performed for first signal 340 prior to calculating the Anc2AbmR feature (i.e., ratio 309). Similar to the Anc2AbmR feature, the degree of a preliminary stationary noise suppression should not be exaggerated, as that will tend to impose the properties of that particular suppression algorithm onto the SRR feature, and result in the SRR feature essentially mirroring SSNR estimate 303 or stationary noise estimate 301 obtained within the stationary noise branch instead of reflecting the reverberation.

Wind noise is typically not an acoustic noise, but a noise generated by the wind moving the microphone membrane (as opposed to the sound pressure wave moving the membrane). It propagates with a speed corresponding to the wind speed which is typically much smaller than the speed of sound in air (i.e., 340 meters/second), with which sound propagates in air. As an effect, there is no correlation between wind noise picked up on two microphones in typical dual-microphone configurations. Hence, an indicator of wind noise can be constructed by measuring the normalized correlation between two microphone signals. This can be extended to measuring the magnitude of the normalized coherence between the two microphone signals in the frequency domain as a function of frequency. This is beneficial since wind noise typically extends from low frequencies towards higher frequencies with a cut-off that increases with the degree of wind noise, and often only part of the spectrum is polluted by wind noise. A probability of desired source, $P_{DS,m}(k)$, and a probability of interfering source, $P_{IS,m}(k)$, with respect to wind noise obtained by GMM modeling of the normalized correlation between two microphone signals only indicates the probability of wind noise presence on one of the two microphones, but if the feature vector is augmented with an additional parameter corresponding to the power ratio between the two microphone signals (in the same frequency bin/range as the correlation/coherence feature), then the joint GMM modeling should be able to facilitate calculation of: (1) the probability of wind noise on a first microphone of a communication device, (2) the probability of desired source on the first microphone of the communication device, (3) the probability of wind noise on a second microphone of the communication device, and (3) the probability of desired source on the second microphone of the communication device, as a function of frequency. This information can be useful in attempts to rebuild desired source on a microphone polluted by wind noise from one that is not polluted by wind noise.

Spatial feature statistical modeling component 714 operates in a similar manner as spatial feature statistical modeling component 314 as described above with reference to FIG. 3C to model features received thereby. However, spatial feature statistical modeling component 714 is further configured to model features associated with multiple types of non-stationary noise and/or other types of interfering sources (i.e., features $\mathbf{709}_{1-k}$) to provide a probability for each of the multiple types non-stationary noise and/or other types of interfering sources (e.g., probabilities $\mathbf{715}_{1-k}$) that a particular frame of input signal 340 is from a particular type of non-stationary noise and/or other type of noise. For example, as shown in FIG. 7, probability $\mathbf{715}_1$ corresponds to a probability that a particular frame of input signal 340 is from a first type of non-stationary noise or other type of interfering source, probability $\mathbf{715}_2$ corresponds to a probability that a particular frame of input signal 340 is from a second type of non-stationary noise or other type of interfering source, and probability $\mathbf{715}_k$ corresponds to a probability that a particular frame of input signal 340 is from a kth type of non-stationary noise or other type of interfering source. Spatial feature statistical modeling component 714 also provides probability (i.e., probability 313) that a particular frame of input signal 340 is from a desired source as described above with reference to FIG. 3C.

SNSNR estimation component 716 may operate in a similar manner as SNSNR estimation component 316 as described above with reference to FIG. 3C to determine an SNSNR estimate for input signal 340. However, SNSNR estimation component 716 is further configured to provide SNSNR estimates (e.g., $\mathbf{717}_{1-k}$) for multiple types of non-stationary noise and/or SNR estimates for other types of interfering sources. For example, as shown in FIG. 7, SNSNR estimate $\mathbf{717}_1$ corresponds to an SNSNR estimate for a first type of non-stationary noise or other type of interfering source, SNSNR estimate $\mathbf{717}_2$ corresponds to an SNSNR estimate for a second type of non-stationary noise or other type of interfering source and SNSNR estimate $\mathbf{717}_k$ corresponds to an SNSNR estimate for a kth type of non-stationary noise or other type of interfering source. SNSNR estimate $\mathbf{717}_1$ may be based at least on probability 313 and probability $\mathbf{715}_1$, SNSNR estimate $\mathbf{717}_2$ may be based at least on probability 313 and probability $\mathbf{715}_2$ and SNSNR estimate $\mathbf{717}_k$ may be based at least on probability 313 and probability $\mathbf{715}_k$.

Multi-noise source gain component 332 may be configured to obtain optimal gain 325 in accordance to Equation 42 as described above. Gain application component 346 may be configured to suppress stationary noise, multiple types of non-stationary noise, residual echo, and/or other types of interfering sources based on optimal gain 325.

Embodiments described herein may be generalized in accordance to FIG. 8. FIG. 8 shows a block diagram of a generalized back-end SCS component 800 in accordance with an example embodiment. Back-end SCS component 800 may be an example of back-end SCS component 116, back-end SCS component 300 or back-end SCS component 700. As shown in FIG. 8, generalized back-end SCS component 800 includes feature extraction components $\mathbf{802}_{1-k}$, statistical modeling components $804_{1-k}$, SNR estimation components $808_{1-k}$ and a multi-noise source gain component 810.

Back-end SCS component 800 may be coupled to a plurality of microphone inputs $806_{1-n}$. In an embodiment where back-end SCS component 800 comprises an implementation of back-end SCS component 116, plurality of microphone inputs $806_{1-n}$ correspond to plurality of microphone inputs $106_{1-n}$. Each of feature extraction components $802_{1-k}$ may be configured to extract features $801_{1-k}$ pertaining to a particular interfering noise source (e.g., stationary noise, a particular type of non-stationary noise, residual echo, reverberation, etc.) from one or more input signals 812 derived from the plurality of microphone inputs $806_{1-n}$. For example, input signal(s) 812 may correspond to microphone inputs that have been processed by the front end and/or have been condensed into an m number of signals, where m is an integer value less than n. For example, with reference to FIG. 2, input signal(s) 812 may correspond to enhanced source signal 240, non-desired source signals 234, FDAEC output signal 224, and/or residual echo information 238.

Each of features $801_{1-k}$ may be provided to a respective statistical modeling component $804_{1-k}$. Each of statistical modeling components $804_{1-k}$ may be configured model the respective features received to determine respective probabilities $803_{1-k}$ that each indicate a probability that particular frame of input signal(s) 812 comprises a particular type of interfering noise source. For example, probability $803_1$ may correspond to a probability that a particular frame of input signal(s) 812 comprises a first type of interfering noise source, probability $803_2$ may correspond to a probability that a particular frame of input signal(s) 812 comprises a second type of interfering noise source, probability $803_3$ may correspond to a probability that a particular frame of input signal(s) 812 comprises a third type of interfering noise source and probability $803_k$ may correspond to a probability that a particular frame of input signal(s) 812 comprises a kth type of interfering noise source. One or more of statistical modeling components $804_{1-k}$ may also determine a probability 805 that a particular frame of input signal(s) comprises a desired source.

Each of probabilities $803_{1-k}$ and 805 may be provided to a respective SNR estimation component $808_{1-k}$. Each of SNR estimation components $808_{1-k}$ may be configured to determine a respective SNR estimate $807_{1-k}$ pertaining to a particular interfering noise source included in input signals(s) 812 based on the received probabilities. For example, SNR estimation component $808_1$ may determine SNR estimate $807_1$, which pertains to a first type of interfering noise source included in input signals(s) 812, based on probability $803_1$ and/or probability 805, SNR estimation component $808_2$ may determine SNR estimate $807_2$, which pertains to a second type of interfering noise source included in input signals(s) 812, based on probability $803_2$ and/or probability 805, SNR estimation component $808_3$ may determine SNR estimate $807_3$, which pertains to a third type of interfering noise source included in input signals(s) 812, based on probability $803_3$ and/or probability 805 and SNR estimation component $808_k$ may determine SNR estimate $807_k$, which pertains to a kth type of interfering noise source included in input signals(s) 812, based on probability $803_k$ and/or probability 805.

Multi-noise source gain component 810 may be configured to determine an optimal gain 811 based at least on probability 805 and/or SNR estimates $807_{1-k}$ in accordance to Equation 42 as described above. A gain application component (e.g., gain application component 346, as shown in FIG. 3C) may be configured to suppress the different types of interfering sources (e.g., stationary noise, multiple types of non-stationary noise, residual echo, and/or other types of interfering sources) based on optimal gain 811.

VI. Example Processor Implementation

FIG. 9 depicts a block diagram of a processor circuit 900 in which portions of communication device 100, as shown in FIG. 1, system 200 (and the components and/or subcomponents described therein), as shown in FIG. 2, back-end SCS component 300 (and the components and/or subcomponents described therein), as shown in FIG. 3C, back-end SCS component 700 (and the components and/or subcomponents described therein), as shown in FIG. 7, back-end SCS component 800 (and the components and/or subcomponents described therein), as shown in FIG. 8, flowcharts 400-600, as respectively shown in FIGS. 4-6, as well as any methods, algorithms, and functions described herein, may be implemented. Processor circuit 900 is a physical hardware processing circuit and may include central processing unit (CPU) 902, an I/O controller 904, a program memory 906, and a data memory 908. CPU 902 may be configured to perform the main computation and data processing function of processor circuit 900. I/O controller 904 may be configured to control communication to external devices via one or more serial ports and/or one or more link ports. For example, I/O controller 904 may be configured to provide data read from data memory 908 to one or more external devices and/or store data received from external device(s) into data memory 908. Program memory 906 may be configured to store program instructions used to process data. Data memory 908 may be configured to store the data to be processed.

Processor circuit 900 further includes one or more data registers 910, a multiplier 912, and/or an arithmetic logic unit (ALU) 914. Data register(s) 910 may be configured to store data for intermediate calculations, prepare data to be processed by CPU 902, serve as a buffer for data transfer, hold flags for program control, etc. Multiplier 912 may be configured to receive data stored in data register(s) 910, multiply the data, and store the result into data register(s) 910 and/or data memory 908. ALU 914 may be configured to perform addition, subtraction, absolute value operations, logical operations (AND, OR, XOR, NOT, etc.), shifting operations, conversion between fixed and floating point formats, and/or the like.

CPU 902 further includes a program sequencer 916, a program memory (PM) data address generator 918 and a data memory (DM) data address generator 920. Program sequencer 916 may be configured to manage program structure and program flow by generating an address of an instruction to be fetched from program memory 906. Program sequencer 916 may also be configured to fetch instruction(s) from instruction cache 922, which may store an N number of recently-executed instructions, where N is a positive integer. PM data address generator 918 may be configured to supply one or more addresses to program memory 906, which specify where the data is to be read from or written to in program memory 906. DM data address generator 920 may be configured to supply address(es) to data memory 908, which specify where the data is to be read from or written to in data memory 908.

VII. Further Example Embodiments

Techniques, including methods, and embodiments described herein may be implemented by hardware (digital and/or analog) or a combination of hardware with one or both of software and/or firmware. Techniques described herein may be implemented by one or more components.

Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, steps and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as signals transmitted over wires. Embodiments are also directed to such communication media.

The techniques and embodiments described herein may be implemented as, or in, various types of devices. For instance, embodiments may be included in mobile devices such as laptop computers, handheld devices such as mobile phones (e.g., cellular and smart phones), handheld computers, and further types of mobile devices, stationary devices such as conference phones, office phones, gaming consoles, and desktop computers, as well as car entertainment/navigation systems. A device, as defined herein, is a machine or manufacture as defined by 35 U.S.C. §101. Devices may include digital circuits, analog circuits, or a combination thereof. Devices may include one or more processor circuits (e.g., processor circuit 1200 of FIG. 12, central processing units (CPUs), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VIII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method, comprising:

receiving an audio signal that comprises at least a first source component and at least one type of interfering source, the audio signal being generated by or derived from at least one signal generated by one or more microphones; and determining a noise suppression gain based on a statistical modeling of at least one feature associated with the audio signal using a mixture model comprising a plurality of model mixtures, a first model mixture of the plurality of model mixtures being associated with the first source component and a second model mixture of the plurality of model mixtures being associated with a type of interfering source of the at least one type of interfering source.

2. The method of claim 1, wherein a respective model mixture of the plurality of model mixtures is associated with one of the first source component or a type of interfering source of the at least one type of interfering source based on one or more properties of the respective model mixture and one or more characteristics of a respective type of interfering source of the at least one type of interfering source.

3. The method of claim 1, said determining comprising:

determining one or more contributions that are derived from the at least one feature; and determining the noise suppression gain based on the one or more contributions.

4. The method of claim 3, wherein the one or more contributions are weighted based on a measure of ambiguity between two or more of the plurality of model mixtures.

5. The method of claim 1, wherein the statistical modeling is adaptive based on at least one feature associated with each frame of the audio signal being received.

6. The method of claim 1, wherein the at least one type of interfering source includes stationary noise and non-stationary noise.

7. The method of claim 1, wherein the noise suppression gain is determined for each of a plurality of frequency bins of the audio signal.

8. A method for applying suppression of interfering sources to an audio signal, comprising:

determining one or more first characteristics associated with a first type of interfering source included in the audio signal, the audio signal being generated by or derived from at least one signal generated by one or more microphones;

determining one or more second characteristics associated with a second type of interfering source included in the audio signal;

determining a gain based on the one or more first characteristics and the one or more second characteristics; and applying the determined gain to the audio signal.

9. The method of claim 8, wherein the determined gain is applied in a manner that is controlled by a tradeoff parameter associated with a measure of spatial ambiguity.

10. The method of claim 8, wherein the one or more first characteristics include a signal-to-noise ratio (SNR) regarding the first type of interfering source and a first measure of probability indicative of a probability that the audio signal is from a first source with respect to the first type of interfering noise, and wherein the one or more second characteristics include an SNR regarding the second type of interfering source and a second measure of probability indicative of a probability that the audio signal is from the first source with respect to the second type of interfering noise.

11. The method of claim 8, wherein the determined gain is applied in a manner that is controlled by a first parameter that specifies a degree of balance between a distortion of a first source included in the audio signal and a distortion of a residual amount of the first type of interfering source included in a noise-suppressed audio signal that is obtained from said applying and a second parameter that specifies a degree of balance between the distortion of the first source included in the audio signal and a distortion of a residual amount of the second type of interfering source included in the noise-suppressed audio signal.

12. The method of claim 11, wherein a value of the first parameter is set based on the probability that the audio signal is from a first source with respect to the first type of interfering source, and wherein a value of the second parameter is set based on the probability that the audio signal is from a first source with respect to the second type of interfering source included in the audio signal.

13. The method of claim 12, further comprising:

determining a rate at which an energy contour associated with the audio signal changes;

setting the value of the first parameter and the value of the second parameter such that an increased emphasis is placed on minimizing the distortion of the first source included in the audio signal in response to determining that the rate at which the energy contour changes is relatively fast; and setting the value of the first parameter such that an increased emphasis is placed on minimizing the distortion of the residual amount of the first type of interfering source included in the noise-suppressed audio signal and setting the value of the second parameter such that an increased emphasis is placed on minimizing the residual amount of the second type of interfering source included in the noise-suppressed audio signal in response to determining that the rate at which the energy contour changes is relatively slow.

14. The method of claim 8, where determining a gain based on the one or more first characteristics and the one or more second characteristics comprises:

determining a gain for each of a plurality of frequency bins of the audio signal based on the one or more first characteristics and the one or more second characteristics, and wherein said applying comprises:

applying each of the determined gains to a corresponding frequency bin of the audio signal.

15. The method of claim 8, wherein the first type of interfering source is stationary noise, and the second type of interfering source is non-stationary noise.

16. A system for applying suppression of interfering sources to an audio signal, comprising:

a signal-to-stationary noise ratio feature statistical modeling component configured to determine one or more first characteristics associated with a first type of interfering source included in the audio signal, the audio signal being generated by or derived from at least one signal generated by one or more microphones;

a spatial feature statistical modeling component configured to determine one or more second characteristics associated with a second type of interfering source included in the audio signal;

a multi-noise source gain component configured to determine a gain based on the one or more first characteristics and the one or more second characteristics; and a gain application component configured to apply the determined gain to the audio signal.

17. The system of claim 16, wherein the gain application component is configured to apply the determined gain in a manner that is controlled by a tradeoff parameter associated with a measure of spatial ambiguity.

18. The system of claim 16, wherein the one or more first characteristics include a signal-to-noise ratio (SNR) regarding the first type of interfering source and a first measure of probability indicative of a probability that the audio signal is from a first source with respect to the first type of interfering noise, and wherein the one or more second characteristics include an SNR regarding the second type of interfering source and a second measure of probability indicative of a probability that the audio signal is from the first source with respect to the second type of interfering noise.

19. The system of claim 16, wherein the gain application component is configured to apply the determined gain in a manner that is controlled by a first parameter that specifies a degree of balance between a distortion of a first source included in the audio signal and a distortion of a residual amount of the first type of interfering source included in a noise-suppressed audio signal that is obtained from said applying and a second parameter that specifies a degree of balance between the distortion of the first source included in the audio signal and a distortion of a residual amount of the second type of interfering source included in the noise-suppressed audio signal.

20. The system of claim 16, wherein the first type of interfering source is stationary noise, and the second type of interfering source is non-stationary noise.

* * * * *